US009568976B2

(12) United States Patent
Akai et al.

(10) Patent No.: US 9,568,976 B2
(45) Date of Patent: Feb. 14, 2017

(54) SEMICONDUCTOR DEVICE AND ELECTRONIC DEVICE

(71) Applicant: Synaptics Japan GK, Tokyo (JP)

(72) Inventors: Akihito Akai, Tokyo (JP); Tsuyoshi Kuroiwa, Tokyo (JP); Tatsuya Ishii, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 271 days.

(21) Appl. No.: 14/085,842

(22) Filed: Nov. 21, 2013

(65) Prior Publication Data

US 2014/0145985 A1    May 29, 2014

(30) Foreign Application Priority Data

Nov. 29, 2012  (JP) .................................. 2012-261023

(51) Int. Cl.
  *G06F 3/041*  (2006.01)
  *G06F 1/32*  (2006.01)
  *G06F 3/044*  (2006.01)

(52) U.S. Cl.
  CPC ........... *G06F 1/3215* (2013.01); *G06F 1/3262* (2013.01); *G06F 1/3265* (2013.01); *G06F 3/044* (2013.01); *G06F 3/0412* (2013.01); *G06F 3/0416* (2013.01); *Y02B 60/1242* (2013.01)

(58) Field of Classification Search
  CPC .... G06F 1/3215; G06F 1/3262; G06F 1/3265; G06F 3/0412; G06F 3/0416; G06F 3/044; Y02B 60/1242
  See application file for complete search history.

(56) References Cited

U.S. PATENT DOCUMENTS

| | | | | |
|---|---|---|---|---|
| 5,396,443 A | * | 3/1995 | Mese .................... | G06F 1/3215 713/321 |
| 5,621,437 A | * | 4/1997 | Jeong .................... | G06F 1/3262 345/173 |
| 6,504,530 B1 | * | 1/2003 | Wilson .................. | G06F 3/0418 345/173 |
| 7,004,394 B2 | * | 2/2006 | Kim ...................... | G06F 1/1616 235/439 |
| 7,176,902 B2 | * | 2/2007 | Peterson, Jr. ........... | G06F 3/043 178/18.01 |
| 8,930,734 B1 | * | 1/2015 | Sharkey ................ | G06F 1/1626 713/300 |

(Continued)

*Primary Examiner* — Amare Mengistu
*Assistant Examiner* — Crystal A Mathews
(74) *Attorney, Agent, or Firm* — Miles & Stockbridge P.C.

(57) ABSTRACT

The semiconductor device has a touch panel controller, a processor and a display driver. The semiconductor device is arranged so as to reduce an electric power uselessly consumed while the action of the display driver is stopped or suspended and further, and an electric power uselessly consumed by the touch-detecting action for recovery of the display driver from the state of the action being stopped or suspended.
The processor built in the semiconductor device together with the touch panel controller and the display driver returns to its workable state from Sleep state each time a given length of time elapses, and then causes the touch panel to perform a touch-detecting action. When the processor cannot acquire a result of judgment as "being touched", it returns to Sleep state again, and waits for the given length of time to elapse.

21 Claims, 15 Drawing Sheets

(56) References Cited

U.S. PATENT DOCUMENTS

| | | | | |
|---|---|---|---|---|
| 8,976,124 B1* | 3/2015 | Wright | G06F 1/3203 | 345/173 |
| 2005/0146511 A1* | 7/2005 | Hill | G06F 3/0436 | 345/173 |
| 2006/0278444 A1* | 12/2006 | Binstead | G06F 3/044 | 178/18.06 |
| 2007/0200833 A1* | 8/2007 | Park | G06F 1/3203 | 345/173 |
| 2007/0257890 A1 | 11/2007 | Hotelling et al. | | |
| 2008/0062150 A1* | 3/2008 | Lee | G06F 3/0416 | 345/175 |
| 2008/0277171 A1* | 11/2008 | Wright | G06F 1/3203 | 178/18.06 |
| 2009/0289908 A1* | 11/2009 | Chen | G06F 1/3262 | 345/173 |
| 2010/0026656 A1* | 2/2010 | Hotelling | G06F 3/044 | 345/174 |
| 2010/0026660 A1* | 2/2010 | Kitamura | G06F 3/044 | 345/174 |
| 2010/0134437 A1* | 6/2010 | Yang | G06F 1/3203 | 345/174 |
| 2010/0165776 A1* | 7/2010 | Tada | G06F 1/32 | 365/226 |
| 2010/0265205 A1* | 10/2010 | Park | G06F 3/047 | 345/174 |
| 2010/0292945 A1* | 11/2010 | Reynolds | G06F 3/044 | 702/65 |
| 2011/0050618 A1* | 3/2011 | Murphy | G06F 1/3215 | 345/174 |
| 2011/0050638 A1* | 3/2011 | Lee | G06F 1/3203 | 345/174 |
| 2011/0193809 A1* | 8/2011 | Walley | G06F 3/044 | 345/173 |
| 2011/0199336 A1* | 8/2011 | Kao | G06F 1/3262 | 345/175 |
| 2012/0071149 A1* | 3/2012 | Bandyopadhyay | G06F 1/1643 | 455/418 |
| 2012/0120247 A1* | 5/2012 | Kao | H04N 5/23241 | 348/169 |
| 2012/0169660 A1* | 7/2012 | Seo | G06F 1/3262 | 345/174 |
| 2012/0191993 A1* | 7/2012 | Drader | G06F 1/3215 | 713/320 |
| 2012/0287081 A1* | 11/2012 | Akai | G06F 3/044 | 345/174 |
| 2013/0113722 A1* | 5/2013 | Lee | G09G 5/00 | 345/173 |
| 2013/0194223 A1* | 8/2013 | Ward | G06F 1/3262 | 345/174 |
| 2013/0215049 A1* | 8/2013 | Lee | G06F 3/0416 | 345/173 |
| 2014/0092031 A1* | 4/2014 | Schwartz | G06F 1/3206 | 345/173 |
| 2015/0234446 A1* | 8/2015 | Nathan | G06F 1/3262 | 345/174 |

* cited by examiner

Fig.16

| | Register(TPC_SCANM) | |
|---|---|---|
| | 1'b0 | 1'b1 |
| DETECTION MODE | FIRST TOUCH DETECTION MODE (MUTUAL CAPACITANCE DETECTION METHOD) | SECOND TOUCH DETECTION MODE (PSEUDO MUTUAL CAPACITANCE DETECTION METHOD) |

Fig.17

| | Register(TPC_RXMODE_OE) | |
|---|---|---|
| | 1'b0 | 1'b1 |
| DETECTION MODE | ODD CHANNEL: DRIVEN EVEN CHANNEL: DETECTED | ODD CHANNEL: DETECTED EVEN CHANNEL: DRIVEN |

SEMICONDUCTOR DEVICE AND ELECTRONIC DEVICE

CROSS-REFERENCE TO RELATED APPLICATIONS

The Present application claims priority from Japanese application JP 2012-261023 filed on Nov. 29, 2012, the content of which is hereby incorporated by reference into this application.

BACKGROUND

The present invention relates to a semiconductor device having a touch panel controller, a display driver and a processor, and further an electronic device having the semiconductor device used therein, and for example, a technique useful in application to a portable information terminal having, as an input device, a touch panel superposed on a liquid crystal panel.

A touch panel which supports a multipoint touch according to a mutual capacitance method has a plurality of drive electrodes and a plurality of detection electrodes, and mutual capacitances formed thereby. A finger or hand brought close to such a touch panel reduces a mutual capacitance between the electrodes near the finger or hand. To detect the position of the electrode where the mutual capacitance change is caused, the touch panel controller drives the drive electrodes sequentially by pulses, integrates, as a signal, a change in voltage developed on each of the detection electrodes capacitively coupling with the drive electrodes, and acquires, by positions between the electrodes, signals resulting from the integration for the respective detection electrodes.

U.S. Patent Application Publication No. 2007/0257890A1 describes this type of controller which drives a touch panel and detects signals according to the mutual capacitance method.

SUMMARY

In a technique for touch detection by means of mutual capacitance, the action of integrating signals of the change in voltage developed on detection electrodes capacitively coupling with drive electrodes is arranged so that a required signal amount can be achieved by changing a drive pulse in pulse multiple times and integrating a signal developed on the detection electrodes as typified by the technique as described in U.S. Patent Application Publication No. 2007/0257890A1. Hence, in touch detection, electric power is consumed by the driving of the electrodes, the operation of the integration circuit, etc. As a result, as the interval between touch detections is made shorter, a larger amount of electric power is consumed. In the case of using a touch panel as an input device, a position coordinate of a touch takes on some meaning in connection with a detail displayed on the display panel. Therefore, in case that an input operation is interrupted with the power source staying on, the action of the display driver may be suspended thereby to cut the power consumption. To return the display driver from the state of the action being stopped, it is sufficient to perform the procedure of making a detection concerning a touch/no touch by use of a touch panel, and then if a touch is detected, putting the display driver in its normally workable state.

Even with the action of the display driver suspended, if the touch panel controller is operated to detect a touch as staying in its normal operation, an electric power will be consumed uselessly.

It is an object of the invention to reduce, in a semiconductor device having a touch panel controller, a processor and a display driver, an electric power uselessly consumed while the action of the display driver is stopped or suspended and further, an electric power uselessly consumed in touch detection to return the display driver from the state of the action being stopped or suspended.

The above and other problems of the invention, and novel features thereof will be apparent from the description hereof and the accompanying drawing.

Of the embodiments herein disclosed, the representative one will be briefly outlined below.

A processor built in the semiconductor device together with a touch panel controller and a display driver returns to its workable state from Sleep state each time a given length of time elapses, and then causes the touch panel to perform a touch-detecting action. When the processor cannot acquire a result of judgment as "being touched", the processor returns to Sleep state again, and waits for the given length of time to elapse. Also, the processor in Sleep state returns to its workable state from Sleep state each time the given length of time elapses. When acquiring a result of judgment as "being touched", the processor makes a request for interruption to outside and waits for a touch-scan-activation instruction from the touch panel controller, and the display driver waits for an activation instruction.

Of the embodiment herein disclosed, the representative embodiment brings about the effect as briefly described below.

The semiconductor device having a touch panel controller, a processor and a display driver is arranged to reduce an electric power uselessly consumed while the action of the display driver is stopped or suspended and further, and an electric power uselessly consumed by the touch-detecting action for recovery of the display driver from the state of the action being stopped or suspended.

BRIEF DESCRIPTION OF THE DRAWINGS

FIG. 16 is an explanatory diagram showing truth values in a case where the first touch detection mode (mutual capacitance detection method) and the second touch detection mode (pseudo mutual capacitance detection method) can be switched by means of register setting; and FIG. 17 is an explanatory diagram showing true values in a case where a driving part and a detector can be switched between even and odd channels by means of register setting with the second touch detection mode (pseudo mutual capacitance detection method) set.

DETAILED DESCRIPTION

1. Summary of the Embodiments

Figure 1:
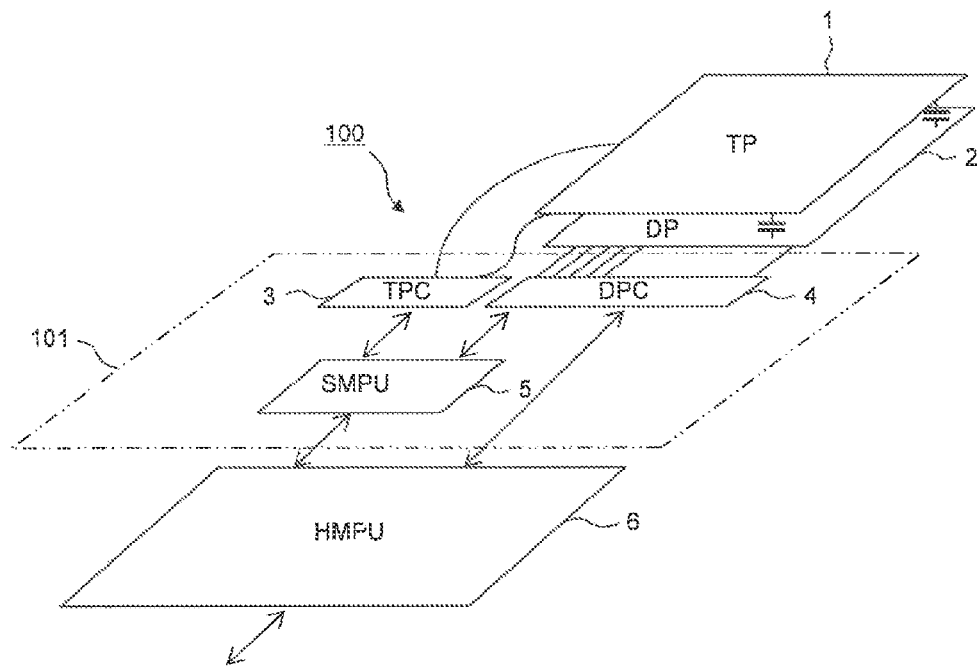
FIG. 1 is a block diagram showing, by example, a portable information terminal which is one embodiment of an electronic device according to the invention.

The embodiments herein disclosed will be outlined first. Here, the reference numerals for reference to the drawings, which are accompanied with paired round brackets, only exemplify what the concepts of members or components referred to by the numerals involve.

[1] <Return to Sleep State on Condition that the Result of Detection as "being Touched" is not Received with Sleep State Canceled>

The semiconductor device (101, 101m) has: a touch panel controller (3) operable to perform pulse-drive control on one electrodes of a touch panel (1) and detection control of touch signals arising on the other electrodes capacitively coupling with the one electrodes; a processor (5) operable to control the touch panel controller; and a display driver (4) operable to perform drive control of a display panel. The processor returns to the workable state from Sleep state each time a given length of time elapses (S1), and causes the touch panel controller to perform the action of detecting a touch/no touch (S3). When the processor cannot take the result of judgment as "being touched" (DTa), it goes into the Sleep state again, and waits for a given length of time to elapse (S5).

According to the embodiment arranged like this, the action of detecting a touch/no touch is regularly performed every time the processor returns to the workable state form Sleep state. Therefore, a lower power consumption is achieved in comparison to that in the case of constantly performing a touch detection while the display driver is out of action. In regard to the detecting action, what is required is detection about a touch or no touch on the touch panel, not a touch scan for calculating a position coordinate, so a simple or low-speed detecting action suffices for such detection. On this account, an electric power consumed by the touch-detecting action for return of the display driver from the state of the action being suspended to the workable state is reduced.

[2] <Make a Request for Interruption and then Wait for a Subsequent Activation Instruction when the Result of Detection is "being Touched" with Sleep State Cancelled>

In the semiconductor device as described in [1], the processor in Sleep state returns to its workable state from Sleep state each time the given length of time elapses (S1); on receipt of the result of judgment as "being touched" (DTb), the processor takes an action (including the issue of a request for interruption, or setting of a flag which can be referred to from outside) for coping with an action from outside (S6), and then waits for a touch-scan-activation instruction from the touch panel controller (S8), and the display driver waits for an activation instruction (S7).

Considering the semiconductor device as a peripheral circuit controlled by the host processor from outside, the arrangement like this is suitable to reduce electric power consumed by touch detection and display control. For instance, even in a case where the processor performs the control for return from Standby state to the workable state, and the control for reset to Standby state by itself, it is necessary to receive display data from outside for display on the display panel.

Hence, if the display driver waits for an activation instruction from outside, useless working time can be saved.

[3] <Touch Condition when Judging as "being Touched">

Figure 6:
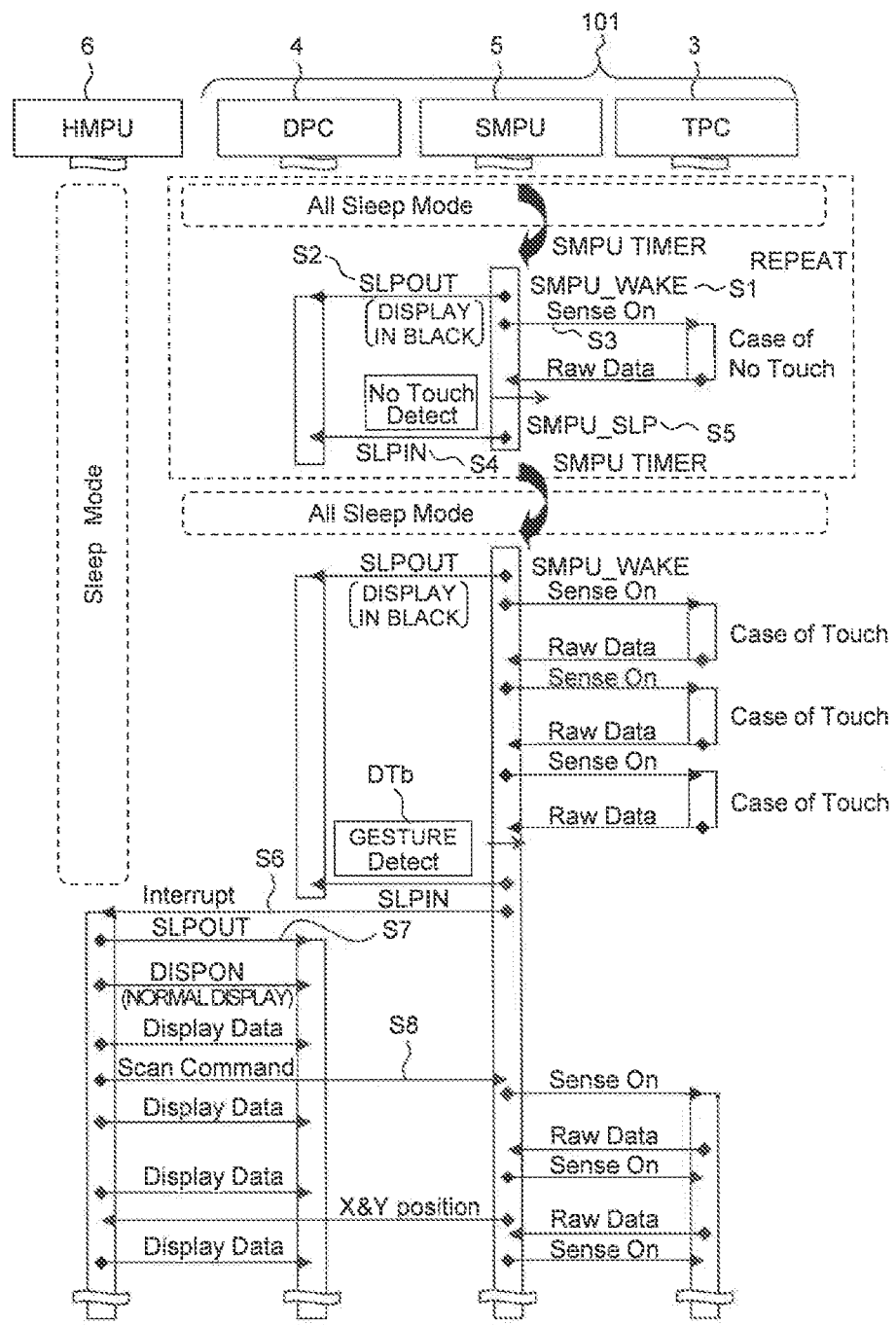
FIG. 6 is a flow diagram showing, by example, another action flow of Sleep setting and cancelling on the controller device.

In the semiconductor device as described in [2], a touch condition when the processor judges as "being touched" is that more than one touch position can be detected (see FIG. 6).

According to the embodiment arranged like this, it is possible to prevent Sleep state from being uselessly cancelled owing to a failure in detection or an operation mistake.

[4] <Coordinate Calculation of a Touch Position on Touch Detection Signals According to Touch Scan>

In the semiconductor device as described in [3], the touch-scan-activation instruction includes an instruction for starting touch scan at intervals shorter than the given length of time. On receipt of the touch-scan-activation instruction, the processor performs a coordinate calculation of a touch position based on touch detection signals obtained by the touch panel.

According to the embodiment arranged like this, the detecting action by means of touch scan and the action of detecting a touch/no touch can be separately executed in a way that the actions are clearly independent on each other. Also, in this respect, the arrangement like this contributes to the reduction in power consumption by the semiconductor device.

[5] <The Touch-Detecting Action According to the Mutual Capacitance Method and the Touch-Detecting Action According to the Pseudo Mutual Capacitance Method>

In the semiconductor device as described in [1], the touch panel controller has: a plurality of drive terminals (PY1 to PYM) connected with the drive electrodes of the touch panel; a first drive circuit (300) operable to output a drive pulse from the drive terminals; a plurality of detection terminals (PX1 to PXN) connected with the detection electrodes of the touch panel; a second drive circuit (311) operable to output a drive pulse to the detection terminals; a detection circuit (301) operable to accumulate signals input, more than once, through the detection terminals in synchronization with a change in the drive pulse thereby creating detection data; and a timing control circuit (308) operable to control the touch-detecting action by use of the first and second drive circuits and the detection circuit. The timing control circuit has: a first touch detection mode in which detection data are created by accumulating, by use of the detection circuit, signals input more than once from the detection terminals in synchronization with a change of the drive pulse output by the first drive circuit; and a second touch detection mode in which detection data are created by accumulating, by use of the detection circuit, signals input more than once from the detection terminals of one of groups consisting of the even and odds detection terminals respectively in synchronization with a change of the drive pulse output from the second drive circuit through the detection terminals of the other group.

According to the embodiment arranged like this, by selecting the second touch detection mode, a touch/no touch can be detected by a simple touch-detecting action with detection electrodes. Also, in this respect, the simple detecting action by which half of the detection electrodes are driven can reduce the electric powder consumed by the detecting action.

[6] <Second Touch Detection Mode Used for Detection of a Touch/No Touch>

In the semiconductor device as described in [5], the action of detecting a touch/no touch which the processor returns to its workable state from Sleep state to cause the touch panel controller to perform each time the given length of time elapses is an action according to the second touch detection mode.

In the embodiment arranged like this, the second touch detection mode is used only for detection of a touch/no touch and therefore, scan of the drive electrodes is not required. Also, it is possible to drive detection terminals of one of even and odd detection terminal groups in parallel in the whole touch panel. The arrangement like this contributes to the reduction in power consumption for the reason that the time for the detecting action can be shortened.

[7] <First Touch Detection Mode Used for Touch Scan>

In the semiconductor device as described in [6], the processor in Sleep state returns to its workable state from Sleep state each time the given length of time elapses. When acquiring the result of judgment as "being touched", the processor makes a request for interruption to outside, and waits for a touch-scan-activation instruction from the touch panel controller, and the display driver waits for an activation instruction. The touch-detecting action in response to the touch-scan-activation instruction is an action according to the first touch detection mode.

Considering the semiconductor device as a peripheral circuit controlled by the host processor from outside as in the case of the semiconductor device described in [2], the arrangement like this is suitable to reduce electric power consumed by touch detection and display control. Further, the first touch detection mode is used in the touch scan and therefore, a touch detection can be performed with high accuracy.

[8] <Touch Condition when Judging as "being Touched">

In the semiconductor device as described in [7], a touch condition when the processor judges as "being touched" in the second touch detection mode is that more than one touch position can be detected.

The semiconductor device arranged like this brings about the same effect and advantage as those of the semiconductor device as described in [3].

[9] <Coordinate Calculation of a Touch Position on Touch Detection Signals According to Touch Scan>

In the semiconductor device as described in [8], the touch-scan-activation instruction includes an instruction for starting touch scan at intervals shorter than the given length of time. On receipt of the touch-scan-activation instruction, the processor performs a coordinate calculation of a touch position based on touch detection signals obtained by the touch panel.

The semiconductor device arranged like this brings about the same effect and advantage as those of the semiconductor device as described in [4].

[10] <Switching Between the First and Second Touch Detection Modes>

In the semiconductor device as described in [5], the timing control circuit has a mode register (TPC_SCANM of 320) capable of rewritably storing instruction data for providing an instruction on which of the first and second touch detection modes to select.

According to the embodiment arranged like this, the first and second touch detection modes can be readily switched by means of a software program running on the processor.

[11] <Switching Between Ways of Using Even and Odd Detection Terminals in the Second Touch Detection Mode>

In the semiconductor device as described in [5], the timing control circuit has a mode register (TPC_RX-MODE_OE of 320) capable of rewritably storing instruction data for providing an instruction on which group of the even and odd detection terminal groups to direct the drive pulse to, and on which group to accept detection signal input from.

According to the embodiment arranged like this, the detection terminal groups for driving and detection can be readily switched by means of a software program running on the processor in the second touch detection mode.

[12] <Embodiment of the Second Drive Circuit>

In the semiconductor device as described in [5], the second drive circuit includes: a voltage-select switch circuit (SW4_ODD, SW4_EVEN, SW5_ODD, SW5_EVEN) operable to alternately select voltages having different levels; and a buffer amplifier (311_1 to 311_N) operable to output, to the corresponding detection terminal, voltages output by the voltage-select switch circuit.

According to the embodiment arranged like this, it is easy to freely control a drive pulse in width and interval on an as-needed basis.

[13] <Return to Sleep State on Condition that the Result of Detection as "being Touched" is not Received with Sleep State Canceled>

The electronic device (100) has: a host processor (6); a touch panel (2) having a plurality of drive electrodes (PY1 to PYM), a plurality of detection electrodes (PX1 to PXN), and capacitance components (Cxy, Crx-rx) formed between the electrodes; a touch panel controller (3) operable to perform pulse-drive control on the one electrodes of the touch panel and detection control of touch signals arising on the other electrodes capacitively coupling with the one electrodes; a processor (5) connected with the host processor and operable to control the touch panel controller; a display panel (2); and a display driver (4) connected with the host processor and operable to perform drive control of the display panel. The processor returns to its workable state from Sleep state each time a given length of time elapses (S1), and causes the touch panel controller to perform an action of detecting a touch/no touch (S3). When the processor cannot take the result of judgment as "being touched" (DTa), it goes into Sleep state again, and waits for a given length of time to elapse (S5).

The electronic device arranged like this brings about the same effect and advantage as those of the semiconductor device as described in [1]. Therefore, the electronic device achieves a low power consumption.

[14] <Make a Request for Interruption and then Wait for a Subsequent Activation Instruction when the Result of Detection is "being Touched" with Sleep State Cancelled>

In the electronic device as described in [13], the processor in Sleep state returns to its workable state from Sleep state each time the given length of time elapses (S1). On receipt of the result of judgment as "being touched" (DTb), the processor takes an action of dealing with the host processor (including the issue of a request for interruption, or setting of a flag which can be referred to from outside) (S6), and waits for a touch-scan-activation instruction from the touch panel controller (S8), and the display driver waits for an activation instruction from the host processor (S7).

The electronic device arranged like this brings about the same effect and advantage as those of the semiconductor device as described in [2]. Therefore, the electronic device achieves a low power consumption.

[15] <Touch Condition when Judging as "being Touched">

In the electronic device as described in [14], a touch condition when the processor judges as "being touched" is that more than one touch position can be detected (see FIG. 6).

The semiconductor device arranged like this brings about the same effect and advantage as those of the semiconductor device as described in [3].

[16] <Coordinate Calculation of a Touch Position on Touch Detection Signals According to Touch Scan>

In the electronic device as described in [15], the touch-scan-activation instruction includes an instruction for starting touch scan at intervals shorter than the given length of time. On receipt of the touch-scan-activation instruction, the processor performs a coordinate calculation of a touch position based on touch detection signals obtained by the touch panel.

The electronic device arranged like this brings about the same effect and advantage as those of the semiconductor device as described in [4]. Therefore, the electronic device achieves a low power consumption.

[17] <The Touch-Detecting Action According to the Mutual Capacitance Method and the Touch-Detecting Action According to the Pseudo Mutual Capacitance Method>

In the electronic device as described in [13], the touch panel controller has: a plurality of drive terminals (PY1 to PYM) connected with the drive electrodes (Y1 to YM) of the touch panel; a first drive circuit (300) operable to output a drive pulse from the drive terminals; a plurality of detection terminals (PX1 to PXN) connected with the detection electrodes (X1 to XN) of the touch panel; a second drive circuit (311) operable to output a drive pulse to the detection terminals; a detection circuit (301) operable to accumulate signals input, more than once, through the detection terminals in synchronization with a change in the drive pulse thereby creating detection data; and a timing control circuit (308) operable to control the touch-detecting action by use of the first and second drive circuits and the detection circuit. The timing control circuit has a first touch detection mode in which detection data are created by accumulating, by use of the detection circuit, signals input more than once from the detection terminals in synchronization with a change of the drive pulse output by the first drive circuit, and a second touch detection mode in which detection data are created by accumulating, by use of the detection circuit, signals input more than once from the detection terminals of one of groups consisting of the even and odd detection terminals respectively in synchronization with a change of the drive pulse output from the second drive circuit through the detection terminals of the other group.

The electronic device arranged like this brings about the same effect and advantage as those of the semiconductor device as described in [5]. Therefore, the electronic device achieves a low power consumption.

[18] <Second Touch Detection Mode Used for Detection of a Touch/No Touch>

In the electronic device as described in [17], the action of detecting a touch/no touch which the processor returns to its workable state from Sleep state to cause the touch panel controller to perform each time the given length of time elapses is an action according to the second touch detection mode.

The electronic device arranged like this brings about the same effect and advantage as those of the semiconductor device as described in [6].

[19] <First Touch Detection Mode Used for Touch Scan>

In the electronic device as described in [18], the processor in Sleep state returns to its workable state from Sleep state each time the given length of time elapses. When acquiring the result of judgment as "being touched", the processor makes a request for interruption to outside, and waits for a touch-scan-activation instruction from the touch panel controller, and the display driver waits for an activation instruction from the host processor. The touch-detecting action in response to the touch-scan-activation instruction is an action according to the first touch detection mode.

The electronic device arranged like this brings about the same effect and advantage as those of the semiconductor device as described in [7]. Therefore, the electronic device achieves a low power consumption.

[20] <Touch Condition when Judging as "being Touched">

In the electronic device as described in [19], a touch condition when the processor judges as "being touched" in the second touch detection mode is that more than one touch position can be detected.

The electronic device arranged like this brings about the same effect and advantage as those of the semiconductor device as described in [3].

[21] <Coordinate Calculation of a Touch Position on Touch Detection Signals According to Touch Scan>

In the electronic device as described in [20], the touch-scan-activation instruction includes an instruction for starting touch scan at intervals shorter than the given length of time. On receipt of the touch-scan-activation instruction, the processor performs a coordinate calculation of a touch position based on touch detection signals obtained by the touch panel.

The electronic device arranged like this brings about the same effect and advantage as those of the semiconductor device as described in [4].

[22] <Switching Between the First and Second Touch Detection Modes>

In the electronic device as described in [17], the timing control circuit has a mode register (TPC_SCANM of 320) which receives, from the host processor, instruction data for providing an instruction on which of the first and second touch detection modes to select, and rewritably stores the instruction data.

The electronic device arranged like this brings about the same effect and advantage as those of the semiconductor device as described in [10].

[23] <<Switching Between Ways of Using Even and Odd Detection Terminals in the Second Touch Detection Mode>>

In the electronic device as described in [17], the timing control circuit has a mode register (TPC_RXMODE_OE of 320) which receives, from the host processor, instruction data for providing an instruction on which group of the even and odd detection terminal groups to direct the drive pulse to, and on which group to accept detection signal input from, and rewritably stores the instruction data.

The electronic device arranged like this brings about the same effect and advantage as those of the semiconductor device as described in [11].

2. Further Detailed Description of the Embodiments

The embodiments will be described further in detail.

<<Portable Information Terminal>>

FIG. 1 shows, by example, a portable information terminal 100 which is one embodiment of the electronic device according to the invention. The portable information terminal 100 is materialized as e.g. a mobile phone or a smart phone. The portable information terminal 100 includes a touch panel (TP) 1, a liquid crystal panel (DP) 2 as an embodiment of the display panel, a touch panel controller (TPC) 3, a liquid crystal driver (DPC) 4 as an embodiment of the display driver, a subprocessor (SMPU) 5 and a host processor (HMPU) 6, and a communication device and a peripheral device; the last two devices are not shown in the drawing, but connected with the host processor 6.

The touch panel controller 3, the liquid crystal driver 4 and the subprocessor 5 are included in a controller device 101 which is an embodiment of the semiconductor device. They may be formed on one semiconductor substrate of single crystal silicon or the like according to e.g. the CMOS integrated circuit manufacturing technology, otherwise their circuits may be formed as module components which will be encapsulated into one multi-chip package.

The detail of the touch panel 1 is not shown in the drawing particularly, but a mutual capacitance type touch panel which enables a multi-touch detection is taken as one embodiment of the touch panel here. The touch panel 1 has a plurality of drive electrodes (Y-electrodes), a plurality of detection electrodes (X-electrodes), and a plurality of intersections formed by the drive and detection electrodes. The intersections each form a capacitance component. The touch panel controller 3 controls the pulse driving of the drive electrodes of the touch panel 1, and controls the detection of touch signals arising on the detection electrodes capacitively coupling with the drive electrodes. Specifically, the touch panel controller sequentially supplies the drive electrodes with a drive pulse, sequentially takes resultant signals from the detection electrodes, and then integrates the signals to obtain detection data corresponding to a variation in the capacitance component at each intersection. The subprocessor 5 is a microprocessor for a subsystem, which has control of the touch panel controller 3, and calculates a touch position coordinate based on touch detection signals from the touch panel 1. Specifically, the subprocessor performs a digital filtering calculation on detection data acquired by the touch panel controller 3 to remove noise therefrom. Based on the resultant data with noise removed therefrom, the subprocessor calculates position coordinates of the intersection with a variation of capacitance caused thereon. That is, the subprocessor calculates a position coordinate at the time of occurrence of an event of touch in order to indicate which intersection a stray capacitance has been changed on, namely which intersection a finger has approached or touched, or which intersection an event of touch has occurred on.

The touch panel 1 includes a transmissive (i.e. translucent) electrode and a dielectric film. The touch panel is superposed on the display face of the liquid crystal panel 2, for example. The forms of the combination of the touch panel 1 and the liquid crystal panel 2 are roughly classified into: an external attachment form in which the touch panel prepared as a discrete part is externally attached to the liquid crystal panel; and an in-cell form in which the touch panel is incorporated in the liquid crystal panel. Any of these forms may be adopted.

The host processor 6 controls the portable information terminal 100 totally, and issues, to the controller device 101, a command for touch detection by the touch panel 1 and a display command for the liquid crystal panel 2. Also, the host processor receives data of touch-detection-position coordinates from the controller device 101, and analyzes an input resulting from an operation on the touch panel 1 from the relation between a touch detection position and a frame of display image.

While not particularly shown in the drawing, the details of the liquid crystal panel 2 will be described here. The liquid crystal panel has a plurality of gate electrodes and a plurality of drain electrodes which are arranged so as to form a matrix, and a plurality of TFT switches formed at intersections of the gate and drain electrodes respectively. Incidentally, TFT stands for "Thin Film Transistor". Each TFT switch is connected, on its source side, with a liquid crystal pixel electrode of the liquid crystal capacitance, forming a sub-pixel, and the opposite-side electrode of the liquid crystal capacitance is formed by a common electrode. The drain electrodes are supplied with e.g. RGB gradation voltages output by the liquid crystal driver 4, and the gate electrodes are supplied with a scan pulse e.g. in the order of the arrangement thereof.

While not shown in the drawing, the details of the subprocessor 5 will be described here. The subprocessor 5 has e.g. a CPU (Central Processing Unit), an interrupt controller, an external interface circuit and a timer counter, which are connected by an internal bus. The external interface circuit receives a command for providing an instruction on the action of the touch panel from the host processor 6. By executing the command for providing an instruction on the action of the touch panel, CPU causes the touch panel controller 3 to activate the touch panel, to take detection signals, to convert the detection signals into digital signals, and to acquire detection data in units of frames. The detection data obtained in units of frames are used in the coordinate calculation by CPU. The coordinate data of a touch position determined by the calculation is provided to the host processor 6.

What is targeted for the control of the action of the touch panel 1 by the touch panel controller 3 is primarily determined by a command provided to the subprocessor 5 from the host processor 6. Examples of such a command include a touch detection command, a calculation command and a low-power-consumption command. The details of the action are defined by command parameters of such commands.

Likewise, while the details of the liquid crystal driver 4 are not shown in the drawing, the liquid crystal driver 4 has e.g. a host interface, a register circuit, a timing generator, a power supply circuit with a charge pump used therein, and a drive circuit for supplying drive and gradation voltages to the liquid crystal panel 2. The host interface is connected to the host processor 6, and receives control data for controlling the activation of the liquid crystal panel 2 from the host processor 6. The received control data are stored in the register circuit. The subprocessor 5 is arranged to be able to access the register circuit. The subprocessor 5 refers to the control data, uses the data for controlling the touch panel 1. Also, the subprocessor 5 is capable of writing control data into the register circuit so as to match with the state of the touch panel 1. Further, the host interface accepts input of display data from the host processor 5, and then provides the display data to the drive circuit. The timing generator controls the order of driving the scan electrodes of the liquid crystal panel 2 and the drive timing in the action mode according to the instruction of the control data, and controls the timing for supplying the display electrodes with gradation voltages depending on the display data in line with the drive timing of the scan electrodes. The power supply circuit provides gradation voltages increased in voltage by the step-up circuit and a scan-drive voltage to the drive circuit and others. What is targeted for the control of the action of the liquid crystal panel 2 by the liquid crystal driver 4 is primarily determined by control data written into the register circuit by the host processor 5.

Figure 2:
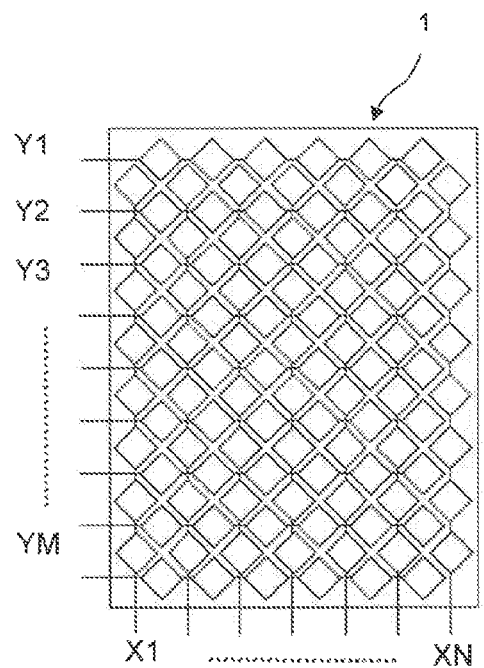
FIG. 2 is a plan view showing, by example, the electrode arrangement of a touch panel.

FIG. 2 shows, by example, the electrode arrangement of the touch panel 1. The touch panel 1 has a number of drive electrodes (namely Y-electrodes) Y1 to YM formed in a horizontal direction, and a number of detection electrodes (namely X-electrodes) X1 to XN formed in a vertical direction; the drive and detection electrodes are electrically insulated from each other. Each electrode has e.g. a square-shaped part interposed at intervals along its extending direction, and the square-shaped part forms a capacitance electrode. At each intersection of the X-electrodes and Y-electrodes, a node capacitance is formed through the capacitance electrodes of the respective electrodes. If an object such as a finger approaches the node capacitance, the object makes a capacitance electrode to form a stray capacitance, which is added to the node capacitance. On application of a drive pulse from the touch panel controller 3, the Y-electrodes Y1 to YM are driven e.g. in the order in which they are arranged.

Figure 3:
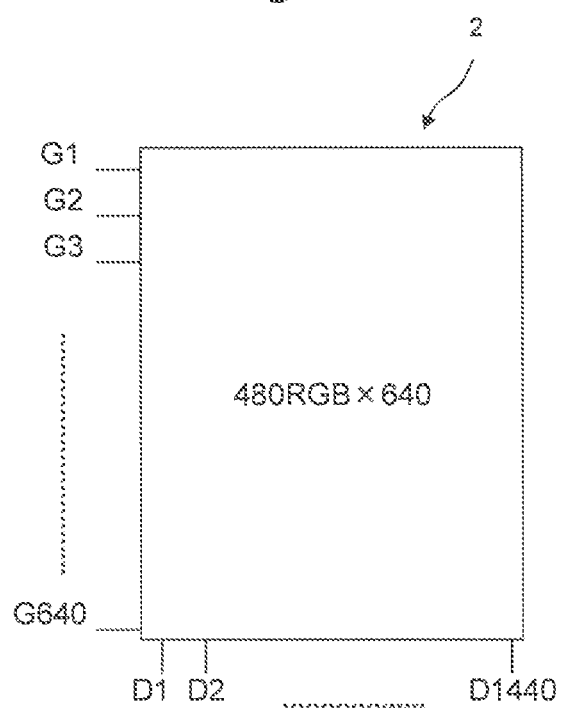
FIG. 3 is a plan view showing, by example, the electrode arrangement of a display panel.

FIG. 3 shows, by example, the electrode arrangement of the display panel 2. The display size of the display panel 2 shown in the drawing is as large as 480 RGB×640, for example. The display panel 2 has: gate electrodes G1 to G640 formed to horizontally extend, and serving as scan electrodes; drain electrodes D1 to D1440 formed to vertically extend, and serving as signal electrodes; and a number of liquid crystal display cells arranged at intersections of the gate and drain electrodes, and each having a select terminal connected to the corresponding scan electrode and an input terminal connected to the corresponding signal electrode. On application of a scan pulse from the display controller 4, the gate electrodes G1 to G640 are driven e.g. in the order in which they are arranged.

<<Touch Panel Controller>>

Figure 4:
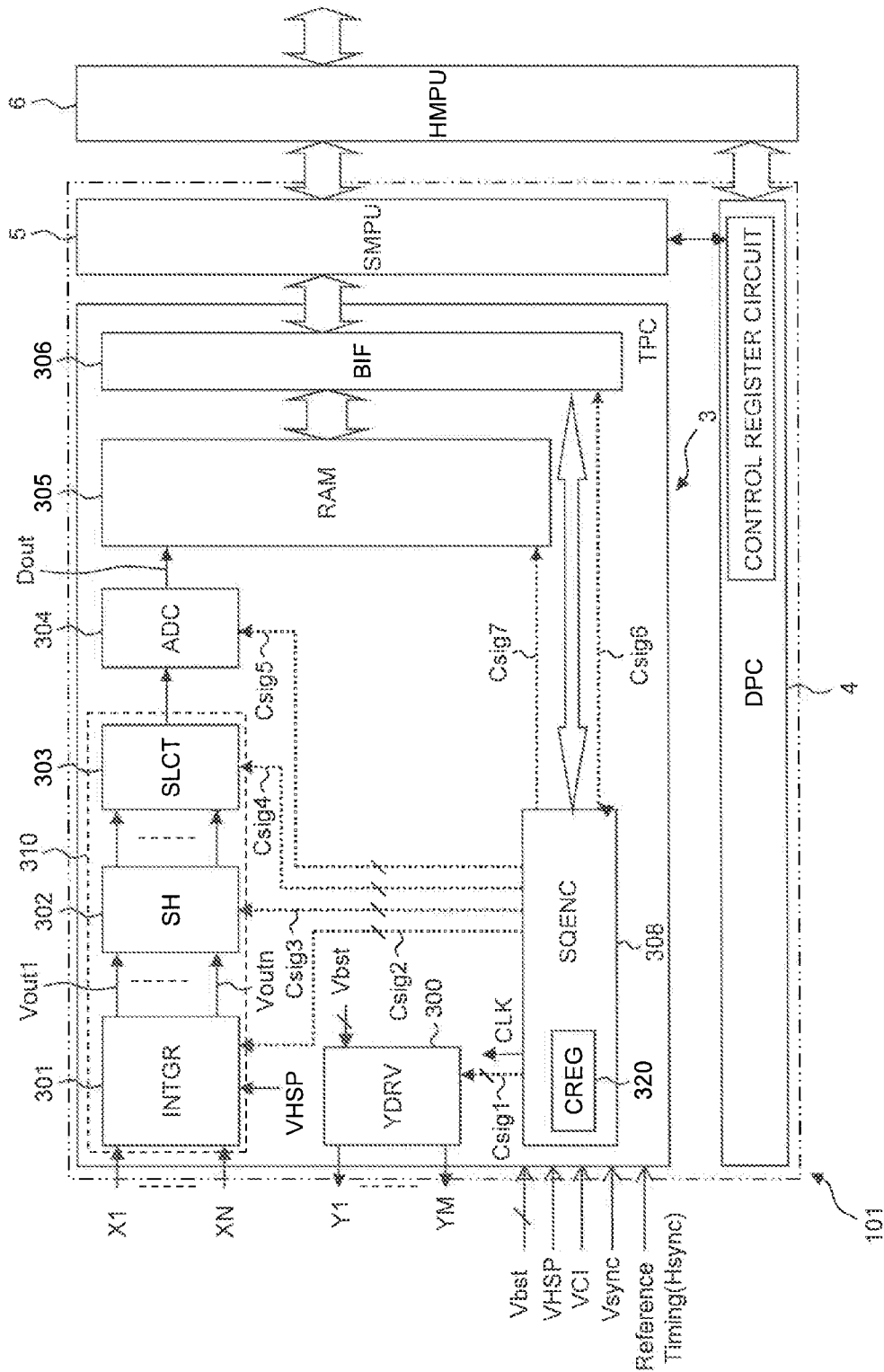
FIG. 4 is a block diagram showing, by example, the whole structure of a touch panel controller.

FIG. 4 shows, by example, the whole structure of the touch panel controller 3. The touch panel controller 3 has: a drive circuit (YDRV) 300; a detection circuit (XDTC) 310; an analog-to-digital conversion circuit (ADC) 304; a RAM 305; a bus interface circuit (BIF) 306; and a sequence-control circuit (SQENC) 308 serving as a control circuit. The detection circuit 310 includes: an integration circuit (INTGR) 301; a sample hold circuit (SH) 302; and a selector (SLCT) 303, for example. A circuit for calibration for the detection circuit 310 is not shown in the drawing. The analog-to-digital conversion circuit is also written as "AD conversion circuit" simply.

The drive circuit 300 repeats the action of sequentially outputting a drive pulse to the Y-electrodes Y1 to YM for detection of a touch with a predetermined timing. The drive pulse supplied to each Y-electrode is controlled so that the number of the pulses is fixed to more than one. At the rising edge of the drive pulse, the potential of the X-electrode Xn capacitively coupling with the Y-electrode Ym is raised.

The change in potential is caused on the X-electrodes X1 to XN in synchronization with the drive pulse, and the integration circuit 301 integrates the potential change in synchronization with the rising edge of the drive pulse. The sample hold circuit 302 holds signals resulting from the integration by detection electrodes as detection signals. The detection signals thus held are converted into detection data by the AD conversion circuit 304 after having selected by the selector 303. The resultant detection data are accumulated in RAM 305. The detection data accumulated in RAM 305 are supplied to the subprocessor 5 through the bus interface circuit 306, and then used in the digital filtering calculation and the coordinate calculation.

The sequence-control circuit 308 uses control signals Csig1 to Csig6 to control the actions of the drive circuit 300, the integration circuit 301, the sample hold circuit 302, the selector 303, the AD conversion circuit 304 and the bus interface circuit 306, and further uses a control signal Csig7 to control access to RAM 305. Although no special restriction is intended, a pulse voltage Vbst of the drive pulse which the drive circuit 300 outputs to the Y-electrodes, an initialization voltage (precharge voltage) VHSP of the X-electrodes input by the integration circuit 301, and a source voltage VCI are supplied from outside the touch panel controller 3. The subprocessor 5 sets, on the control register 320, instruction data for providing an instruction for the activation of the touch panel 2 and the action mode for the detecting action, etc. The sequence-control circuit 308 accepts the input of a vertical synchronizing signal Vsync of the liquid crystal panel 2 and a reference-timing signal Tref for use in driving the touch panel 1 and the liquid crystal panel 2 according to a time division method. The reference-timing signal Tref is a timing signal used to create a drive timing of the drive electrode Ym. For instance, a horizontal synchronizing signal Hsync of the liquid crystal panel 2 may be used as the reference-timing signal Tref.

<<Cancelling of Sleep on Controller Device and Reduction in Power Consumption Involved with Touch Detection>>

Figure 5:
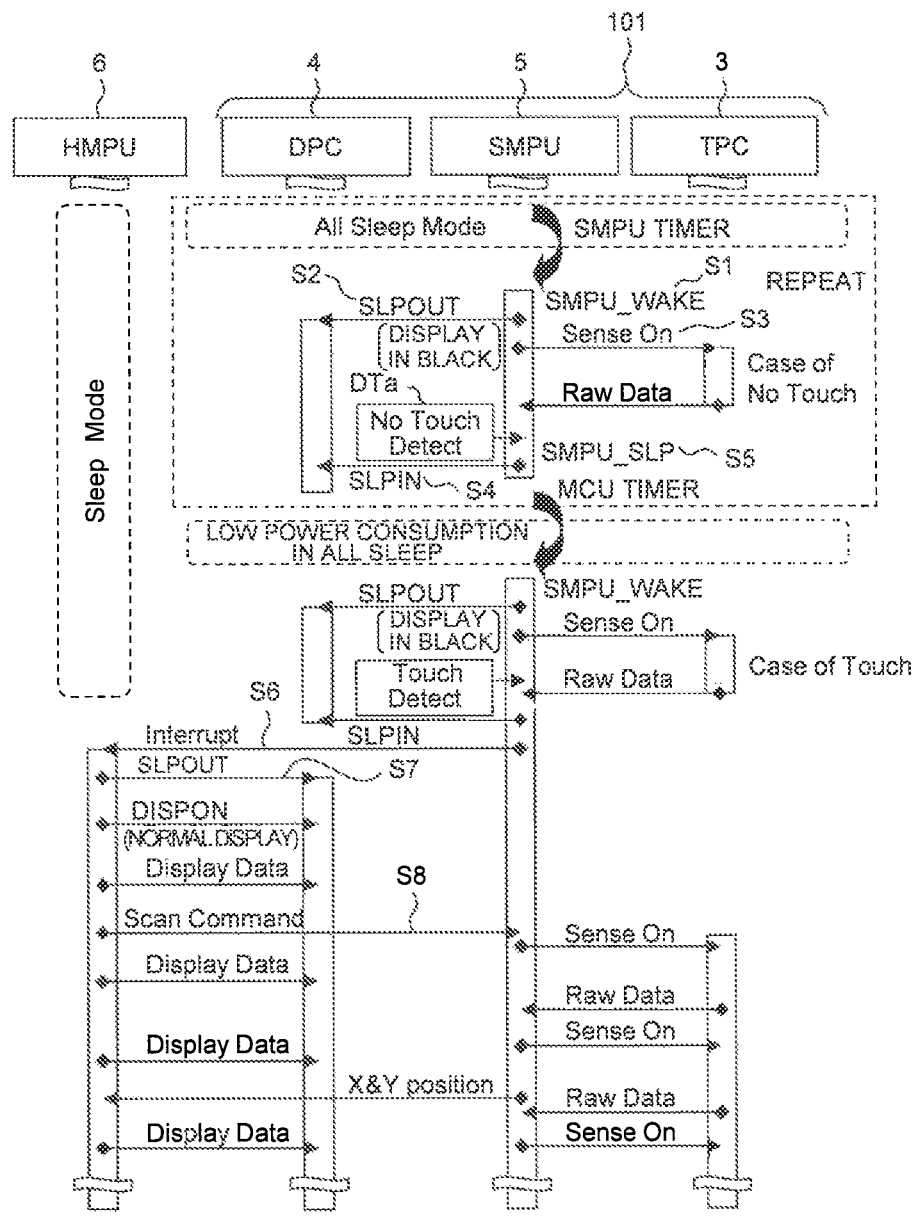
FIG. 5 is a flow diagram showing, by example, an action flow of Sleep setting and cancelling on a controller device.

FIG. 5 shows, by example, an action flow of Sleep setting and cancelling on the controller device. The Sleep setting on the controller device 101 is performed by execution of a sleep command by CPU of the subprocessor. The cancelling of Sleep is performed in response to the occurrence of an interruption to CPU from the outside, or a time-out interruption by the timer counter which has been set in advance. On condition that the subprocessor 5 stays in Sleep state, the touch panel controller is not allowed to work. The Sleep setting and cancelling on the display driver 4 are performed by setting and clear of sleep-instruction data on the register circuit (see FIG. 4) by the host processor 6 or subprocessor 5, respectively. When the display driver 4 is brought into Sleep state, the liquid crystal panel 2 turned to a non-display state. When the sleep-instruction data is cleared, the display of the full screen of the liquid crystal panel 2 remains displaying in black until gradation data is supplied thereto.

It is a prerequisite for reduction in power consumption that when the frequency of obtaining the result of judgment as "being touched" in touch detection by the touch panel 3 reaches a threshold or below, the host processor 6 sets sleep-instruction data on the liquid crystal driver 4, and causes the subprocessor 5 to execute a sleep command. The state like this is herein referred to as "Sleep state of the controller device 101" for the sake of convenience.

In Sleep state of the controller device, the timer counter of the subprocessor 5 works as a timer and for example, it cancels the Sleep state by making a request for a time-out interruption to CPU owing to an elapse of 50 msec (S1). The subprocessor 5 is returned to its workable state in response to the cancel of Sleep clears sleep-instruction data of the liquid crystal driver 4 (S2) and further causes the touch panel controller 3 to perform the action of detecting a touch/no touch (S3). Consequently, if the subprocessor 5 does not receive the result of judgment as "being touched", the subprocessor 5 sets sleep-instruction data on the liquid crystal driver 4 (S4), and goes into Sleep state again by itself and waits for the elapse of 50 msec on the timer counter (S5). According to the embodiment arranged like this, the action of detecting a touch/no touch is regularly performed every time the subprocessor 5 returns to the workable state from Sleep state. Therefore, a lower power consumption is achieved in comparison to that in the case of constantly performing a touch detection while the liquid crystal driver 4 is out of action. In regard to the detecting action, what is required is detection about a touch or no touch on the touch panel, not a touch scan for calculating a position coordinate, so a simple or low-speed detecting action suffices for such detection. On this account, an electric power consumed by the touch-detecting action for return of the display driver from the state of the action being suspended to the workable state is reduced.

When the subprocessor 5 acquires the result of judgment as "being touched" (DT1) after the return to the workable state from Sleep state, the subprocessor makes a request for interruption to the host processor 6 (S6), and then waits for a touch-scan-activation instruction from the touch panel controller 3 (S8), and the display driver 4 waits for an activation instruction (S7). Considering the controller device 101 as a peripheral circuit controlled by the host processor 6, the arrangement like this is suitable to reduce electric power consumed by touch detection and display control. For instance, even in a case where the subprocessor 5 performs the control for return from Sleep state to the workable state (S1), and the control for reset to Sleep state (S5) by itself, it is necessary to receive display data (gradation data) from the host processor 6 for display on the display panel 2. Hence, if the display driver 4 waits for an activation instruction from the host processor 6 (S7), the time for which the liquid crystal driver 4 works uselessly can be saved.

The touch-scan-activation instruction (S8) includes an instruction for starting touch scan at intervals of e.g. 8 msec shorter than 50 msec. Following the instruction, CPU of the subprocessor 5 sets, as a time-out, 8 msec on the timer counter, and the touch scan is performed on a touch frame of the touch panel 1 in every time-out set in this way. According to the embodiment arranged like this, the detecting action by means of touch scan and the action of detecting a touch/no touch can be separately executed in a way that the actions are clearly independent on each other. Also, in this respect, the arrangement like this contributes to the reduction in power consumption by the controller driver 101. The CPU of the subprocessor 5 calculates the coordinate of a touch position by use of touch detection data gained by touch scan for each touch frame. The judgment about whether detection data is data resulting from a touch or data associated with no touch is made based on the fact that a value of the detection data is no lower than threshold or not. The position coordinate is calculated factoring in the direction in which the drive electrodes are driven and the position where detection data is detected, with reference to the layout of the drive and detection electrodes.

The criteria of judging as "being touched" is a number of touch points, which may be one, two or more than two. If the number of touch points of the criteria of the judgment is set to two or more, it is possible to prevent Sleep state from being cancelled uselessly owing to a failure in detection or an operation mistake.

FIG. 6 shows, by example, another action flow of Sleep setting and cancelling on the controller device. The action of Sleep setting and cancelling is different from that described with reference to FIG. 5 in the precondition of causing an interruption to the host processor 6 (S6), which is not whether the touch panel is being touched or not (DTa) simply. As such a precondition, a touch condition which allows the detection of a touch position to be executed two or more times temporally is defined. The action of Sleep setting and cancelling which allows more than one detection temporally is different from that as described with reference to FIG. 5 in that the criteria of judgment for start is a particular gesture (DTb) such as the action of tracing a face of the touch panel 2. According to the embodiment of the action of Sleep setting and cancelling arranged like this, it is possible to prevent Sleep state from being uselessly cancelled owing to a failure in detection or an operation mistake. The other features are the same as those of the embodiment described with reference to FIG. 5. Therefore, like steps are identified by the same reference characters, and the detailed descriptions thereof are skipped here.

Figure 7:
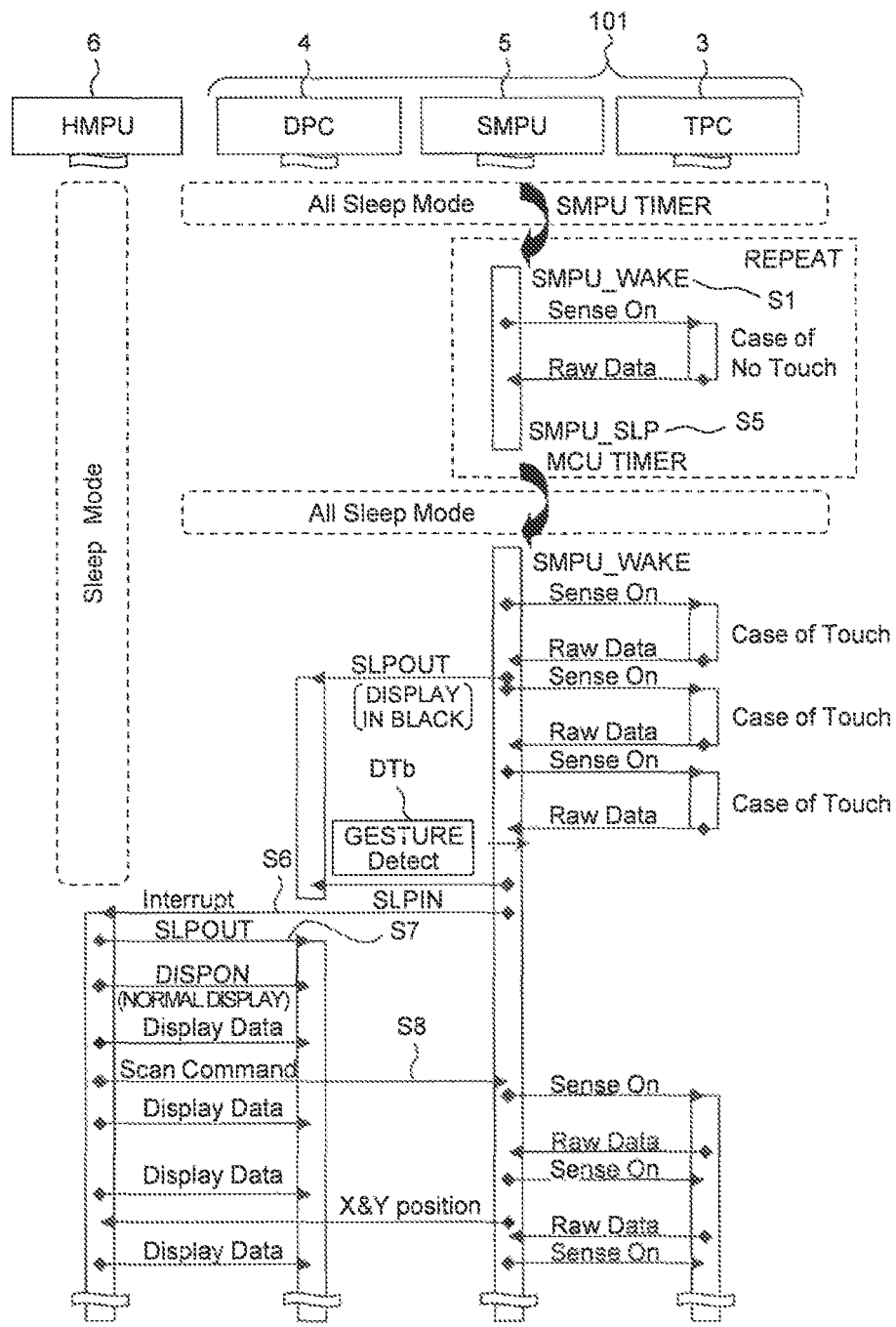
FIG. 7 is a flow diagram showing, by example, still another action flow of Sleep setting and cancelling on the controller device.

FIG. 7 shows, by example, still another action flow of Sleep setting and cancelling on the controller device. The action of Sleep setting and cancelling as described in FIG. 7 is different from that described with reference to FIG. 6 in that the liquid crystal driver 4 is kept in Sleep state during a low-frequency touch-detection period, namely a period from the cancel of Sleep (S1) to the reset of Sleep (S5). In the embodiment of FIG. 7, if the judgment of "being touched" is made, the liquid crystal driver 4 goes into a mode of display in black, which is a low-power mode of the liquid crystal panel 2 once, and the touch panel controller 3 performs a touch detection successively as in the embodiment described with reference to FIG. 6. As a result of the successive touch detections, on condition that a particular gesture, e.g. the action of tracing a face of the sensor panel is detected (DTb), an interruption to the host processor 6 is caused (S6), the liquid crystal driver 4 allows the liquid crystal panel 2 to perform normal gradation display, and the touch panel controller 3 makes the touch panel execute the touch detection with a high frequency, e.g. at intervals of 8 msec. The other features are the same as those of the embodiment described with reference to FIG. 6. Therefore, like steps are identified by the same reference characters, and the detailed descriptions thereof are skipped here.

Figure 8:
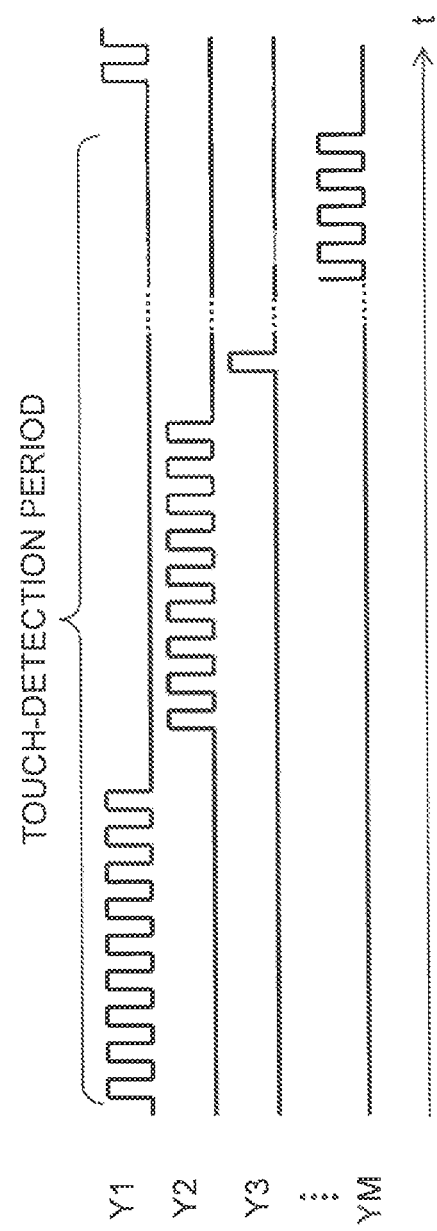
FIG. 8 is a timing diagram showing, by example, a touch-detection period T1 according to a mutual capacitance detection method by which a drive pulse is input to a drive electrode Ym linearly in sequence.

FIG. 8 shows a touch-detection period T1 according to a mutual capacitance detection method by which a drive pulse is input to the drive electrode Ym (m is 1 to M) linearly in sequence. The touch-detection period T1 in touch scan is 8 msec. According to the control of the frequency of the touch detection as described above, if e.g. the interval is made 50 msec as the condition of the detection frequency at the time of a low frequency, the working rate of the circuit for touch detection is 8 msec/50 msec, and thus it becomes possible to reduce the average current. Correspondingly, the power consumption can be further reduced by forcing the host processor 6, the liquid crystal driver 4 and the touch panel controller 3 to go into Sleep state following the flow diagrams presented by FIGS. 5 to 7.

<<The Touch-Detecting Action According to the Mutual Capacitance Method and the Touch-Detecting Action According to the Pseudo Mutual Capacitance Method>>

Figure 9:
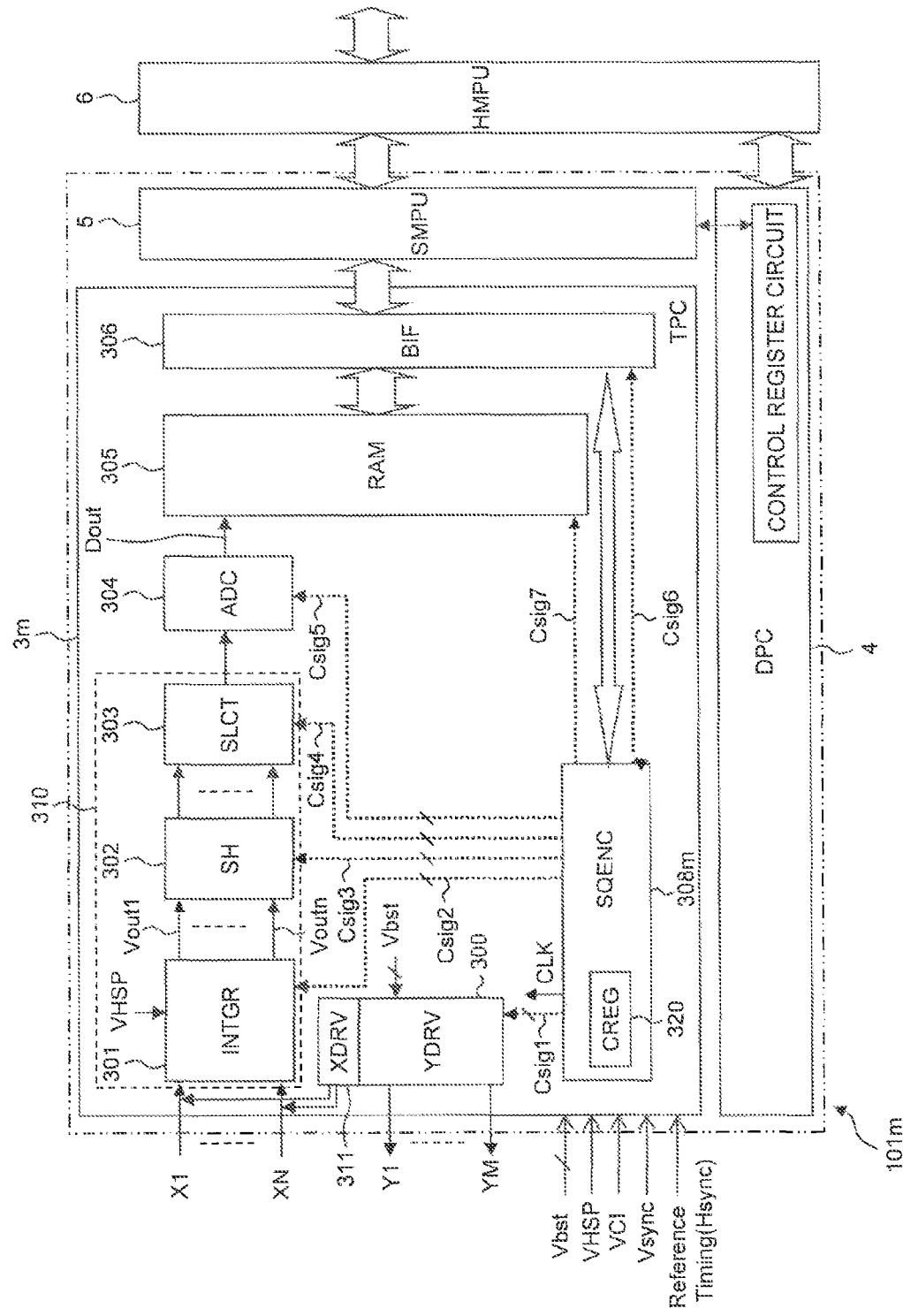
FIG. 9 is a block diagram showing, by example, the whole structure of another controller device having a touch panel controller which enables a touch-detecting action according to the mutual capacitance method, and a touch-detecting action according to the pseudo mutual capacitance method.

FIG. 9 shows, by example, the whole structure of a controller device 101m having a touch panel controller 3m which enables the touch-detecting action according to the mutual capacitance method, and the touch-detecting action according to the pseudo mutual capacitance method. The controller device 101m is different from the controller device 101 of FIG. 4 in that a drive circuit (XDRV) 311 operable to drive the detection electrodes X1 to XN by means of pulses is added to enable the execution of the touch-detecting action according to the pseudo mutual capacitance method. Specifically, like the touch panel controller 3 of FIG. 5, the touch panel controller 3m of FIG. 9 has: a plurality of drive terminals PY1 to PYM connected with a plurality of drive electrodes Y1 to YM of a touch panel 1; a plurality of detection terminals PX1 to PXN connected with a plurality of detection electrode X1 to XN of the touch panel 1; a first drive circuit (YDRV) 300 operable to output a drive pulse through the drive terminals PY1 to PYM; and a second drive circuit (DRV) 311 operable to output a drive pulse to the detection terminals PX1 to PXN. The detection circuit 310 accumulates signals which are input more than once from the detection terminals PX1 to PXN in synchronization with the change in a drive pulse from the first drive circuit 300 or the second drive circuit 311, thereby producing detection data. The sequence-control circuit 308m serving as a timing control circuit controls the touch-detecting action by use of the first drive circuit 300, the second drive circuit 311 and the detection circuit 310. The sequence-control circuit 308m has a first touch detection mode and a second touch detection mode. The first touch detection mode is an action mode in which detection data are created by accumulating, by use of the detection circuit 310, signals input more than once from the detection terminals PX1 to PXN in synchronization with a change of the drive pulse output by the first drive circuit 300. The second touch detection mode is an action mode in which detection data are created by accumulating, by use of the detection circuit 310, signals input more than once to detection terminals of one of groups consisting of the even detection terminals PX2j (j is 1 to N/2) and the odd detection terminals PX2j−1 respectively in synchronization with a change of the drive pulse output by the second drive circuit 311 from the detection terminals of the other of the groups consisting of the even detection terminals PX2j and the odd detection terminals PX2j−1 respectively.

Figure 10:
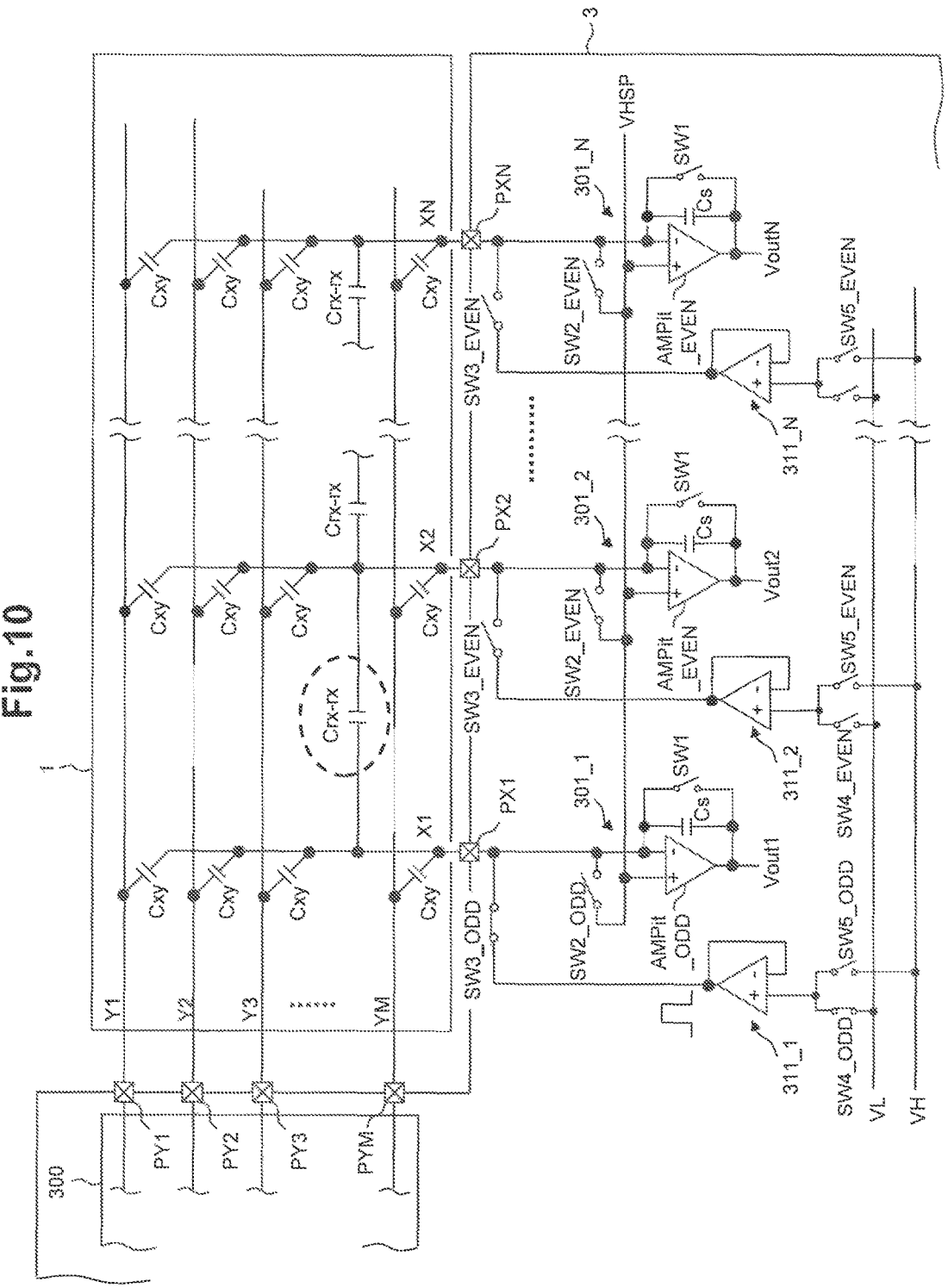
FIG. 10 is a circuit diagram showing, by example, the equivalent circuit of the touch panel in combination with specific embodiments of a second drive circuit and an integration circuit in a detection circuit.

FIG. 10 shows, by example, the equivalent circuit of the touch panel 1 in combination with specific embodiments of the second drive circuit 311 and the integration circuit 301 in the detection circuit 310. In the touch panel 1, primarily coupled capacitances (mutual capacitances) Cxy are formed at intersections of the drive electrodes Y1 to YM and the detection electrodes X1 to XN. In addition, attention is also focused on secondarily coupled capacitances (pseudo mutual capacitances) Crx-rx between adjacent electrodes of the detection electrodes X1 to XN here.

The integration circuit 301 includes integrators 301_1 ... to 301_N corresponding to the X-electrodes X1 to XN; a precharge switch SW2_ODD is connected to the odd detection terminal X2j−1, and a precharge switch SW2_EVEN is connected to the even detection terminal X2j. The precharge switches SW2_ODD and SW2_EVEN are each a switch for selectively supplying the X-electrodes X1 to XN with a precharge voltage VHSP for charging the X-electrodes X1 to XN. The integrators 301_1 to 301_N each include: an operational amplifier AMPit_ODD, AMPit_EVEN having a non-inverting input terminal (+) supplied with the precharge voltage VHPS and an inverting input terminal (−) connected with the corresponding X-electrode Xn (n is 1 to N); an integration capacitance Cs; and a switch SW1 for resetting the integration capacitance Cs.

The second drive circuit 311 includes buffer amplifiers (voltage follower amplifiers) 311_1 to 311_N corresponding to the X-electrodes X1 to XN. The odd detection terminal X2n−1 is supplied with an output of the corresponding buffer amplifier through the switch SW3_ODD; the even detection terminal X2n is supplied with an output of the corresponding buffer amplifier through the switch SW3_EVEN. The odd buffer amplifiers 311_1, 311_3, and so on are selectively supplied with a low level VL and a high level VH through switches SW4_ODD and SW5_ODD respectively, whereby the drive pulse can be produced. Likewise, the even buffer amplifiers 311_2, 311_4, and so on are selectively supplied with the low level VL and the high level VH through switches SW4_EVEN and SW5_EVEN, whereby the drive pulse can be produced. While not particularly shown in the drawing, a sequence-control circuit 308m produces switch control signals for the switches SW3_ODD, SW3_EVEN, SW4_ODD, SW4_EVEN, SW5_ODD and SW5_EVEN. Now, it is noted that a circuit connected with the odd detection terminal PX2j−1 is referred to as "odd channel" simply, and a circuit connected with the even detection terminal PX2j is referred to as "even channel" simply.

Figure 11:
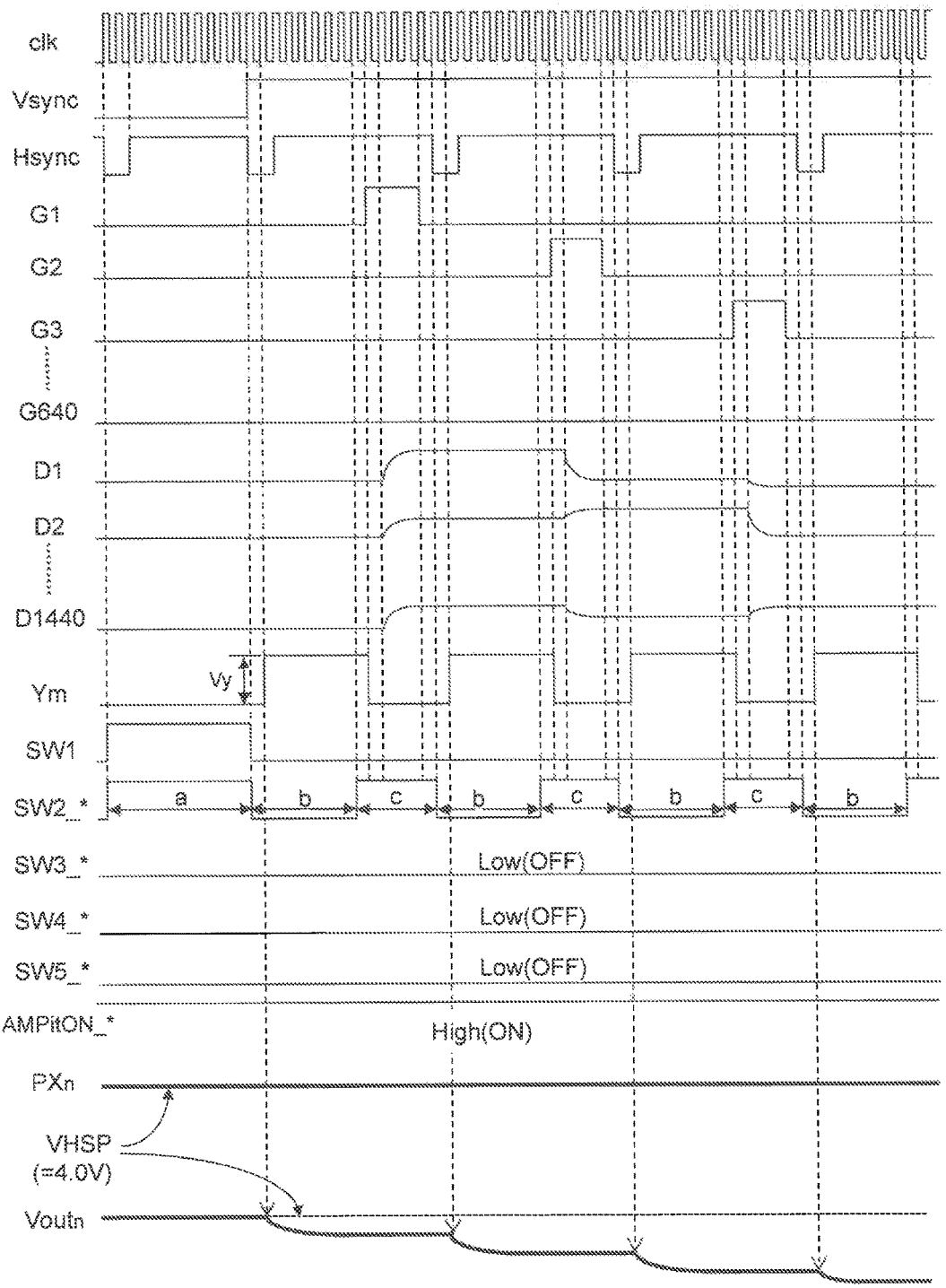
FIG. 11 is a timing diagram showing, by example, a timing of the touch-detecting action in a first touch detection mode.

FIG. 11 shows, by example, the timing of a touch-detecting action in the first touch detection mode. In the first touch detection mode, the first drive circuit 300 drives the drive electrodes Y1 to YM, and then a touch detection (specifically, touch detection according to the mutual capacitance method) is performed based on the mutual capacitance Cxy. In this time, the switches SW3_ODD, SW3_EVEN, SW4_ODD, SW4_EVEN, SW5_ODD and SW5_EVEN are kept OFF constantly, the control of the detection terminals is not varied between even and odd positions.

The voltage of the voltage waveform of the X-electrode Xn, and the initial voltage of the voltage waveforms at output terminals Vout1 to VoutN of the operational amplifiers AMPit are both VHSP. The switches SW1 and SW2_* (*=ODD or EVEN) are controlled in synchronization with an action-reference clock clk, and its control signal is produced by the sequence-control circuit 308m. The high-level width, the low-level width and the cycle of a drive pulse to be supplied to the Y-electrode Ym can be changed by the setting on the control register 320 of the sequence-control circuit 308.

The period "a" is a reset period of the integration capacitance Cs and also, a precharge period of the precharge voltage VHSP of the X-electrode Xn. The period "b" is a detection period when performing the detection by use of the rising edge of the drive pulse provided to the Y-electrode Ym. The period "c" is a standby period of touch detection.

First, in the period "a", the switch SW2_* is turned ON, and a predetermined voltage level VHSP is applied to an input of the integration circuit 301, and the X-electrodes X1 to XN of the touch sensor 2 to bring the integration circuit into a reset state. After that, the switch SW2_* is turned OFF; the integration circuit 301 is set in a state of waiting for a touch signal. In this state of waiting for detection, the X-electrode Xn remains disconnected to the precharge voltage VHSP, but the voltage level of the inverting input terminal (−) of the integration circuit 301 arranged to be virtually grounded is maintained as it is.

After the transition to the state of waiting for detection, a rising pulse having an amplitude Vy is input to the Y-electrode Y1 as the drive pulse (with other Y-electrodes Y2 to YM fixed at the low level). As a result, an electric charge (=Vy×Cxy) is moved to the X-electrode Xn (X1 to XN) through a node capacitance Cxy on the Y-electrode Y1, and the output voltage Voutn of the operational amplifier AMPit which has received the electric charge through the inverting input terminal (−) transitions towards a lower voltage by a voltage corresponding to the charge thus moved. If a finger is present near a certain node capacitance Cxy, the combined capacitance value of the node capacitance Cxy is reduced owing to a stray capacitance produced by the finger. For instance, if the capacitance value of the node capacitance Cxy is reduced by a capacitance value Cf at the intersection of the X-electrode X2 and the Y-electrode Y1, a charge to be input to the operational amplifier AMPit of the X-electrode X2 is Vy×(Cxy−Cf), and a reduction in the level of the output voltage Vout2 of the operational amplifier AMPit_EVEN of the detection electrode PX2 is smaller than that when no finger is present on or near the intersection. This action is repeated more than once in synchronization with rising edges in pulse changes in the drive pulse supplied to the Y-electrode Y1. Thus, the output voltage Voutn of the operational amplifier AMPit_ODD, AMPit_EVEN of each detection electrode is accumulated as shown by the waveform of FIG. 11.

Figure 12:
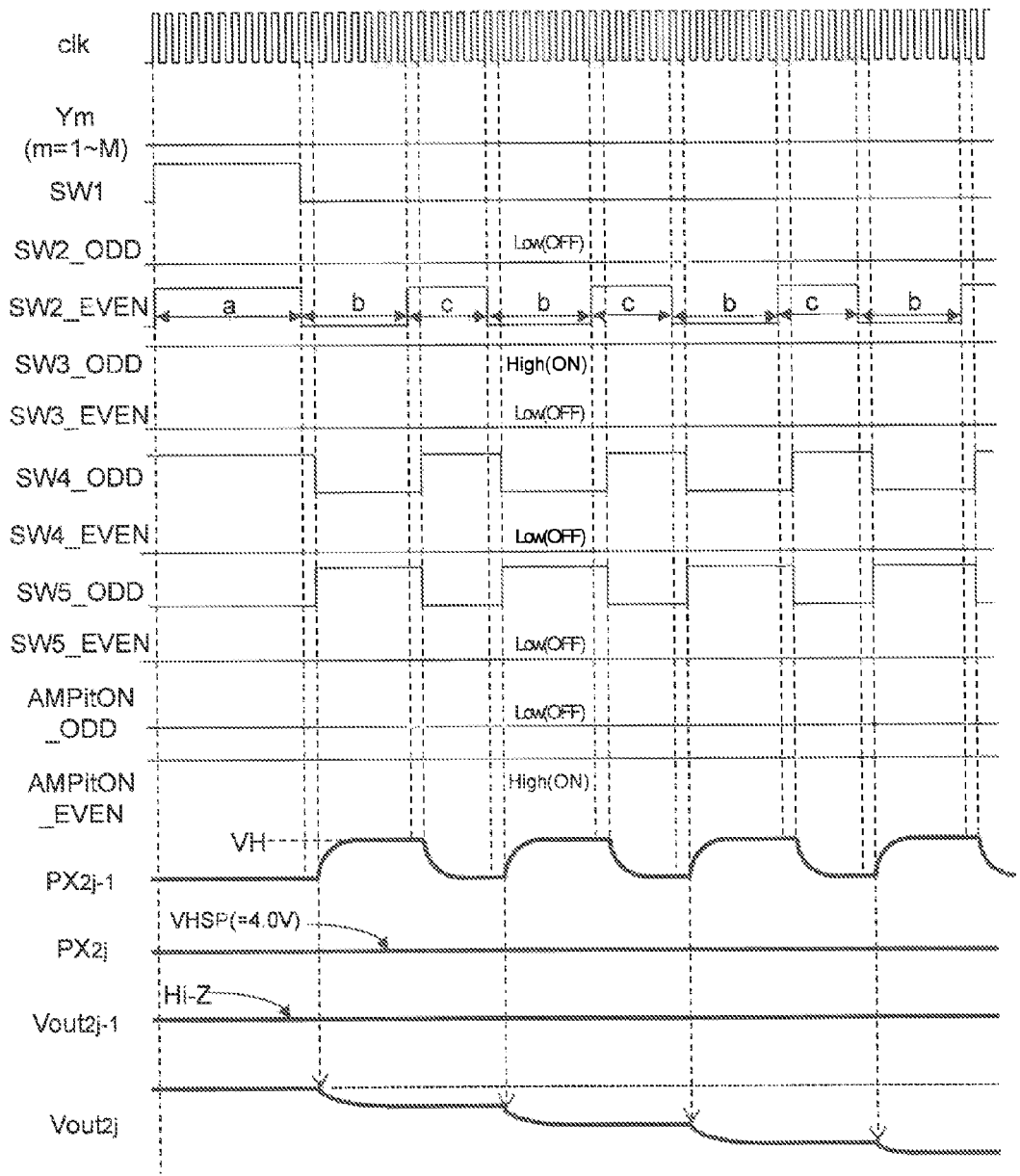
FIG. 12 is a timing diagram showing, by example, a timing of the touch-detecting action in a second touch detection mode.

FIG. 12 shows, by example, the timing of a touch-detecting action in the second touch detection mode. In the second touch detection mode, the second drive circuit 311 drives one of the groups of even and odd detection electrodes, and then touch detection (specifically, pseudo touch detection according to the mutual capacitance method) is performed based on the pseudo mutual capacitances Crx-rx. In this time, the first drive circuit 300 is out of action; of the switches SW2_*, any one switches of the odd (ODD) and even (EVEN) switches are left OFF constantly; and with the switches SW3_*, SW4_* and SW5_*, the other switches of the odd (ODD) and even switches are used in a condition that they remain OFF constantly.

FIG. 12 shows the case of using the detection electrode X2j−1 of an odd channel set for a driving part, and the detection electrode PX2j of an even channel set for a detector as an example. The control signal AMPitON is an ON/OFF control signal for the integration amplifier AMPit, the integration amplifier AMPit_EVEN in the even channel detector is fixed in ON state, and the integration amplifier AMPit in the odd channel driving part is fixed in OFF state. This control reduces the steady current consumption of the integration amplifier AMPit_*.

In the second touch detection mode, a pulse of an upward protruding-shape is applied to the detection electrode X2j−1, and the switch SW2_EVEN is controlled in switching while staying in step with it. As a result, the output Vout2j of the integration amplifier AMPit_EVEN transitions stepwise, thereby accumulating a result of detection of the capacitance Crx-rx. In contrast, the integration amplifier AMPit_ODD is made inactive and therefore, its output Vout2j−1 becomes a high impedance (Hi-Z).

Figure 13:
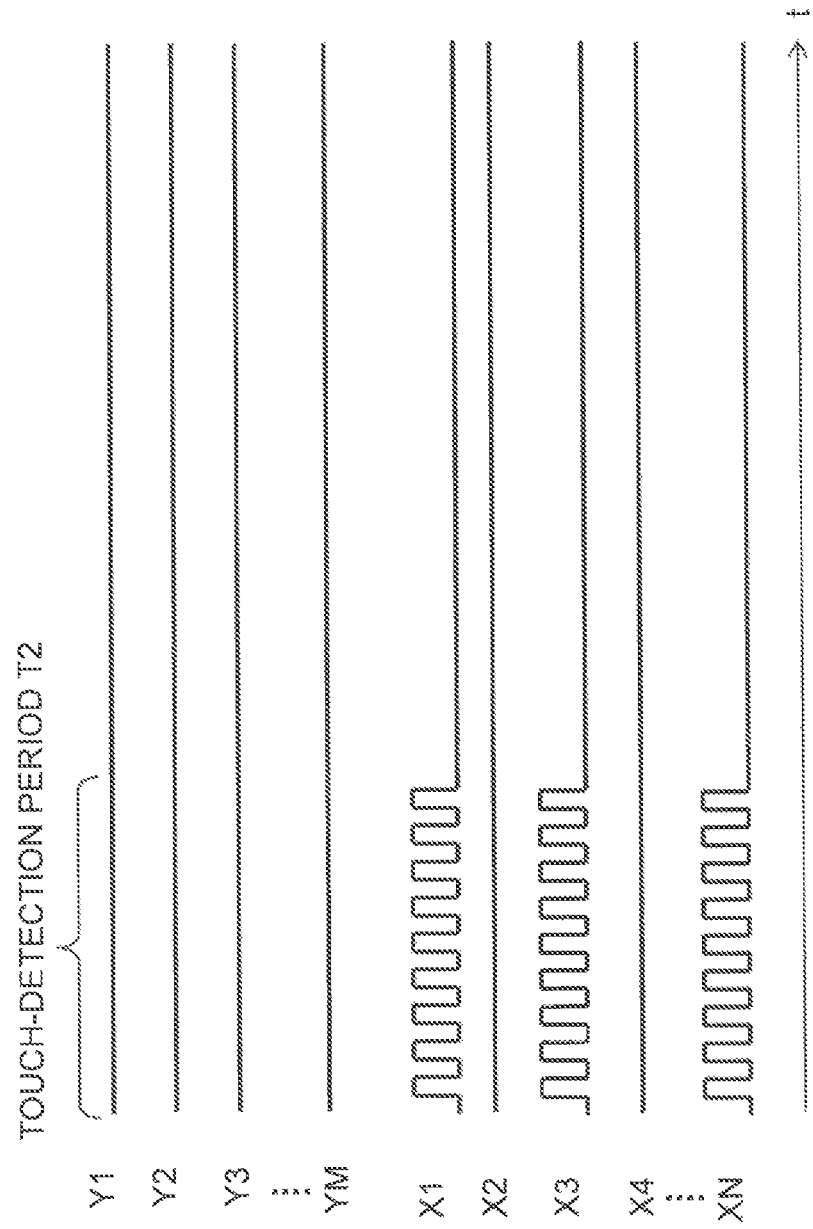
FIG. 13 is a timing diagram showing, by example, a touch-detection period T2 in the second touch detection mode (in the pseudo mutual capacitance detection method)

FIG. 13 shows a touch-detection period T2 in the second touch detection mode (the pseudo mutual capacitance detection method). Unlike the mutual capacitance detection method described with reference to FIG. 8, the pseudo mutual capacitance detection method avoids the need to input a drive pulse linearly in sequence. Just judging the presence or absence of change in the inter-line capacitance Crx-rx of the detection electrodes Xn, the detection period can be shortened to about 1/M in comparison to that in the mutual capacitance detection method as long as the number of integrations is coincident with each other. The arrangement like this shortens the touch-detection time, and contributes to the reduction in electric power.

Figure 14:
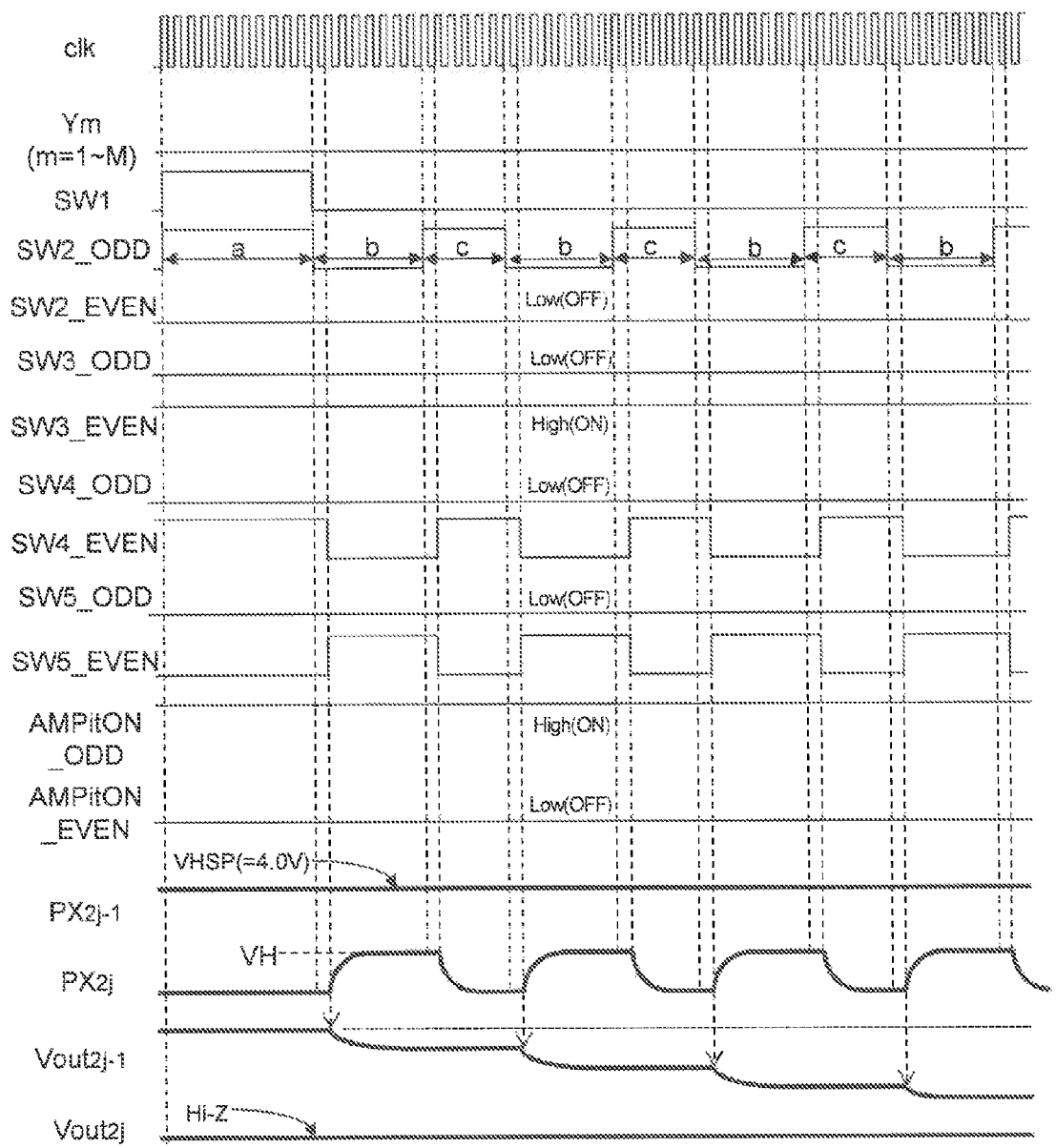
FIG. 14 is a timing diagram showing, by example, another timing of the touch-detecting action in the second touch detection mode.

FIG. 14 shows, by example, another timing of a touch-detecting action in the second touch detection mode. In this embodiment, the roles of the driving part and detector assigned to the odd and even channels in the embodiment shown in FIG. 12 are exchanged with each other. The device arranged like this functions in the same way as in the embodiment shown in FIG. 12.

Figure 15:
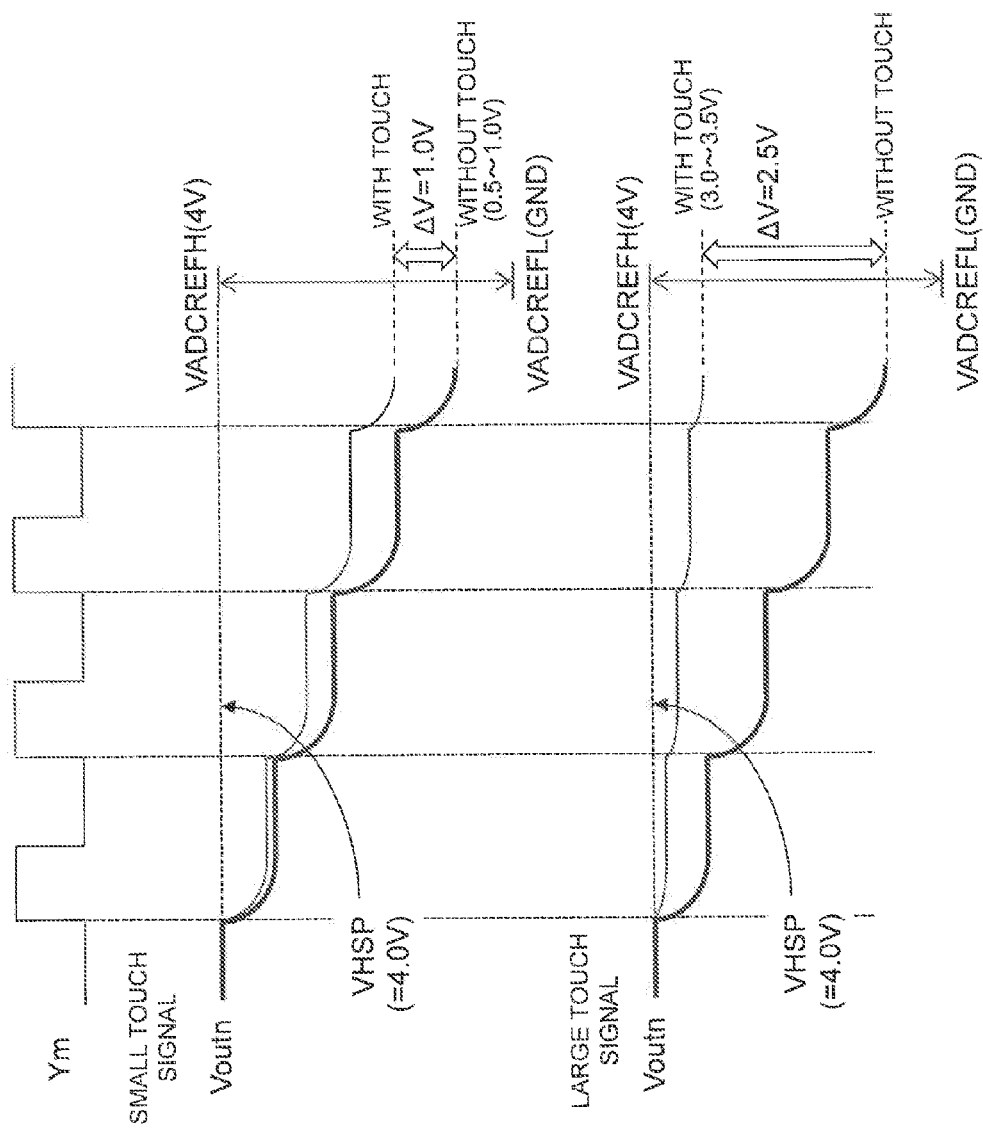
FIG. 15 is a waveform diagram showing, by example, the voltage transition waveform of an output voltage of an integration amplifier with a touch/no touch.

FIG. 15 shows, by example, the voltage transition waveform of an output voltage Voutn of the integration amplifier AMPit_* with a touch/no touch in the case of the drive pulse consisting of a quartet of drive pulses. The second row portion from the top of the drawing shows a transition waveform in the case of a small change in capacitance with a touch. The bottom row portion of the drawing shows a transition waveform in the case of a large change in capacitance with a touch. In the drawing, the drive pulse consisting of a quartet of pulses is shown, but the detecting action is executed usually in groups of more than 4 pulses, e.g. 32 pulses. In the mutual capacitance detection method (first touch detection mode), the drive pulse is input through the drive electrode Ym; in the pseudo mutual capacitance detection method the drive pulse is input through e.g. the detection electrodes of the odd channel. The action of a circuit on the side of the detection electrodes which is used for the detecting action is unchanged between those detection methods. The same is true as for the tendency of the output waveform of the integration amplifier in the out-of touch condition and in-touch condition.

Selecting the second touch detection mode (pseudo mutual capacitance detection method) as described above, a touch/no touch can be detected by a simple touch-detecting action with detection electrodes. Also, in this respect, the simple detecting action by which half of the detection electrodes are driven can reduce the powder consumption.

The subprocessor 5 returns to its workable state from Sleep state each time the given length of time elapses. It is preferable to adopt the second touch detection mode for the action of detecting a touch/no touch which the subprocessor 5 in the workable state makes the touch panel controller 3 execute. In the arrangement like this, the second touch detection mode is used only for detection of a touch/no touch and therefore, scan of the drive electrodes according to the driving method as described with reference to FIG. 8 is not required. Also, it is possible to drive detection terminals of one of even and odd detection terminal groups in parallel in the whole touch panel as described with reference to FIG. 13. The arrangement like this contributes to the reduction in power consumption for the reason that the time for the detecting action can be shortened.

The subprocessor 5 in Sleep state returns to its workable state from Sleep state each time the given length of time elapses. When acquiring the result of judgment as "being touched" in the workable state, the subprocessor 5 makes a request for interruption to outside, and waits for a touch-scan-activation instruction from the touch panel controller 3, and the display driver waits for an activation instruction. In this connection, it is preferable that the touch-detecting action to be executed in response to the touch-scan-activation instruction is an action in the first touch detection mode. Making the arrangement like this, highly accurate touch detection can be performed in touch detection by means of touch scan.

FIG. 16 shows a truth table in a case where the first touch detection mode (mutual capacitance detection method) and the second touch detection mode (pseudo mutual capacitance detection method) can be switched by means of register setting. As typically shown by FIGS. 11 and 12, differently controlling switches included in the detection circuit, the action can be switched between the first touch detection mode (mutual capacitance detection method) and the second touch detection mode (pseudo mutual capacitance detection method). Setting the logical value of detection mode bit (TPC_SCANM) of the control register 320 to zero (0) enables the execution of the detecting action according to the first touch detection mode (mutual capacitance detection method). Setting the logical value of the detection mode bit (TPC_SCANM) to one (1) allows the execution of the detecting action according to the second touch detection mode (pseudo mutual capacitance detection method). The detection mode bit (TPC_SCANM) can be overwritten by the subprocessor 5 voluntarily, or programmably overwritten by the subprocessor 5 according to an instruction from the host processor 6.

According to the embodiment arranged like this, the first and second touch detection modes can be readily switched by means of a software program running on the processor.

FIG. 17 is a truth table in a case where the driving part and the detector can be switched between the even and odd channels by means of register setting with the second touch detection mode (pseudo mutual capacitance detection method) set. As typically shown by FIGS. 12 and 14, the roles of the detection electrodes can be switched by means of switch control. Setting the logical value of the drive-detection switching bit (TPC_RXMODE_OE) of the control register 320 to zero (0), the odd channel is assigned to the driving, and the even channel is assigned to the detection, whereby the execution of the detecting action is enabled. Setting the logical value of the drive-detection switching bit (TPC_RXMODE_OE) to one (1), the even channel is assigned to the driving, and the odd channel is assigned to the detection, whereby the execution of the detecting action is enabled. Specifically, according to a value of the drive-detection switching bit (TPC_RXMODE_OE), the sequence-control circuit 308 can be switched the state of switches SW2_*, SW3_*, SW_4*, SW_5*, and the state of the amplifier activation control signal AMPitON_*.

According to the embodiment arranged like this, the detection terminal groups for driving and detection can be readily switched by means of a software program running on the processor in the second touch detection mode.

The invention is not limited to the above-described embodiments. It is obvious that various changes and modifications may be made without departing from the subject matter thereof.

For instance, as described above, the touch panel controller 3 and the liquid crystal driver 4 may be formed in one chip. Further, the touch panel controller 3, the liquid crystal driver 4 and the subprocessor 5 may be formed in one chip. In consideration of the fact that the number of setting items for the control register 320 is increased, the latter one-chip structure is advantageous. The touch panel 1 and the liquid crystal panel 2 may be formed as separate parts. Otherwise, they may be united into an in-cell structure. Further, a glass-covering integration structure into which the touch panel 1 and a glass cover to set on a top face of the touch panel are united may be adopted.

While the above description has been presented on the assumption that the device is arranged so that the processor in Sleep state returns to its workable state from Sleep state each time the given length of time elapses, and the processor makes a request for interruption to the host processor on receipt of the result of judgment as "being touched", the following arrangement is also possible: a flag whose value is turned to "1" on receipt of the result of judgment as "being touched" is previously prepared, and the host processor refers to (polls) the flag regularly, and then decides the subsequent action. In this case, after confirming the flag has transitioned to "1", the host processor may send out the touch-scan-activation instruction, and the activation instruction of the display driver.

Further, the touch panel 2 is not limited to a rhombus as shown in FIG. 2 in the shape of electrodes. A grid shape may be adopted instead.

In the case of the device described with reference to FIG. 3, it is assumed that the liquid crystal panel 2 provides the resolution of VGA (480RGB×640), and it is an a-Si (amorphous silicon) type device. The resolution of the liquid crystal panel 2 may not be VGA. The device is not limited to a-Si type, and it may be an LTPS (Low-temperature Poly Silicon) type device. Further, the display panel is not limited to the liquid crystal panel 2. It may be a display panel which performs gradation control at a voltage level, e.g. organic EL (OLED).

The action of detecting a touch/no touch which the touch panel controller performs after the Sleep of the subprocessor 5 is cancelled, which has been described with reference to FIGS. 5 to 7, is not limited to use the second touch detection mode. In the aspect of the invention like this, it is not an essential requirement that the detection circuit has the second touch detection mode and a circuit structure therefor. A touch panel controller having only the first detection mode may be arranged.

What is claimed is:

1. A semiconductor device which is formed on one semiconductor substrate of single-crystal silicon, comprising:
    a touch panel controller operable to perform pulse-drive control on a first group of electrodes of a touch panel and detection control of touch signals arising on a second group of electrodes capacitively coupled with the first group of electrodes;
    a processor operable to perform control of the touch panel controller; and
    a display driver operable to perform drive control of a display panel,
    wherein the display driver operates while the processor remains in a sleep state,
    wherein the touch panel controller does not operate while the processor remains in the sleep state,
    wherein the sleep state is set by execution of a sleep command by the processor and is cancelled in response to an interrupt sent to the processor,
    wherein the processor returns to a workable state from the sleep state each time a given length of time elapses, and causes the touch panel controller to perform an action of detecting a touch/no touch,
    wherein when the processor cannot acquire a result of judgment as "being touched", the processor returns to the sleep state again, and waits for a given length of time to elapse, wherein the processor returns to its workable state from the sleep state each time the given length of time elapses, wherein upon receipt of the result of judgment as "being touched", the processor takes an action to a host processor disposed outside of the semiconductor device for processing the result, and waits for a touch-scan-activation instruction in response to the action taken by the processor from the host processor disposed outside of the semiconductor device for causing the touch panel controller to perform an action of detecting a touch/no touch, and the display driver waits for an activation instruction in response to the action taken by the processor from the host processor disposed outside of the semiconductor device, and wherein the display driver receives the activation instruction from the host processor disposed outside of the semiconductor device before the touch panel controller receives the scan-activation instruction from the host processor disposed outside of the semiconductor device.

2. The semiconductor device according to claim 1, wherein a touch condition when the processor judges as "being touched" is that more than one touch position can be detected.

3. The semiconductor device according to claim 2,
wherein the touch-scan-activation instruction is formed based on a time-out interruption by a timer counter in the processor, wherein the touch-scan-activation instruction includes an instruction for starting touch scan at intervals shorter than the given length of time, and wherein upon receipt of the touch-scan-activation instruction, the processor performs a coordinate calculation of a touch position based on touch detection signals obtained by the touch panel.

4. The semiconductor device according to claim 1, wherein the touch panel controller has:

a plurality of drive terminals connected with the first group of electrodes of the touch panel;

a first drive circuit operable to output a drive pulse from the drive terminals;

a plurality of detection terminals connected with the second group of electrodes of the touch panel;

a second drive circuit operable to output a drive pulse to the detection terminals;

a detection circuit operable to accumulate signals input, more than once, through the detection terminals in synchronization with a change in the drive pulse thereby creating detection data; and a timing control circuit operable to control a touch-detecting action by use of the first and second drive circuits and the detection circuit, and wherein the timing control circuit has a first touch detection mode in which detection data are created by accumulating, by use of the detection circuit, signals input more than once from the detection terminals in synchronization with a change of the drive pulse output by the first drive circuit, and a second touch detection mode in which detection data are created by accumulating, by use of the detection circuit, signals input more than once from the detection terminals of one of groups consisting of the even and odd detection terminals respectively in synchronization with a change of the drive pulse output from the second drive circuit through the detection terminals of the other group.

5. The semiconductor device according to claim 4,
wherein the action of detecting a touch/no touch which the processor returns to its workable state from the sleep state to cause the touch panel controller to perform each time a given length of time elapses is an action according to the second touch detection mode.

6. The semiconductor device according to claim 5,
wherein the processor in the sleep state returns to its workable state from the sleep state each time the given length of time elapses, wherein, when acquiring the result of judgment as "being touched", the processor makes a request for an interrupt to an outside of the semiconductor device, and waits for a touch-scan-activation instruction from the touch panel controller, and the display driver waits for an activation instruction, and wherein the touch-detecting action in response to the touch-scan-activation instruction is an action according to the first touch detection mode.

7. The semiconductor device according to claim 6, wherein a touch condition when the processor judges as "being touched" in the second touch detection mode is that more than one touch position can be detected.

8. The semiconductor device according to claim 7,
wherein the touch-scan-activation instruction includes an instruction for starting touch scan at intervals shorter than the given length of time, and wherein upon receipt of the touch-scan-activation instruction, the processor performs a coordinate calculation of a touch position based on touch detection signals obtained by the touch panel.

9. The semiconductor device according to claim 4, wherein the timing control circuit has a mode register capable of rewritably storing instruction data for providing an instruction on which of the first and second touch detection modes to select.

10. The semiconductor device according to claim 4, wherein the timing control circuit has a mode register capable of rewritably storing instruction data for providing an instruction on which group of the even and odd detection terminal groups to direct the drive pulse to, and on which group to accept detection signal input from.

11. The semiconductor device according to claim 4, wherein the second drive circuit includes:

a voltage-select switch circuit operable to alternately select voltages having different levels; and a buffer amplifier operable to output, to the corresponding detection terminal, voltages output by the voltage-select switch circuit.

12. An electronic device comprising:

a host processor;

a touch panel having a plurality of drive electrodes, a plurality of detection electrodes, and capacitance components formed between each of the pluralities of electrodes;

a touch panel controller operable to perform pulse-drive control on a first group of electrodes of the touch panel and detection control of touch signals arising on a second group of electrodes capacitively coupled with the first group of electrodes;

a processor connected with the host processor and operable to control the touch panel controller;

a display panel; and a display driver connected with the host processor and operable to perform drive control of the display panel, wherein the touch panel controller, the processor, and the display driver are formed on one semiconductor substrate of single-crystal silicon, wherein the display driver operates while the processor remains in a sleep state, wherein the touch panel controller does not operate while the processor remains in the sleep state, wherein the sleep state is set by execution of a sleep command by the processor and is cancelled in response to an interrupt sent to the processor, wherein the processor returns to a workable state from the sleep state each time a given length of time elapses, and causes the touch panel controller to perform an action of detecting a touch/no touch, wherein, when the processor cannot acquire the result of judgment as "being touched", the processor returns to the sleep state again, and waits for the given length of time to elapse, wherein the processor in the sleep state returns to its workable state from the sleep state each time the given length of time elapses, wherein upon receipt of the result of judgment as "being touched", the processor takes an action to the host processor for processing the result, and waits for a touch-scan-activation instruction in response to the action taken by the processor from the host processor for causing the touch panel controller to perform an action of detecting a touch/no touch, and the display driver waits for an activation instruction in response to the action taken by the processor from the host processor, and wherein the display driver receives the activation instruction from the host processor before the touch panel controller receives the scan-activation instruction from the host processor.

13. The electronic device according to claim 12, wherein a touch condition when the processor judges as "being touched" is that more than one touch position can be detected.

14. The electronic device according to claim 13, wherein the touch-scan-activation instruction is formed based on a time-out interruption by a timer counter in the processor, wherein the touch-scan-activation instruction includes an instruction for starting touch scan at intervals shorter than the given length of time, and wherein upon receipt of the touch-scan-activation instruction, the processor performs a coordinate calculation of a touch position based on touch detection signals obtained by the touch panel.

15. The electronic device according to claim 12, wherein the touch panel controller has:

a plurality of drive terminals connected with the first group of electrodes of the touch panel;

a first drive circuit operable to output a drive pulse from the drive terminals;

a plurality of detection terminals connected with the second group of electrodes of the touch panel;

a second drive circuit operable to output a drive pulse to the detection terminals;

a detection circuit operable to accumulate signals input, more than once, through the detection terminals in synchronization with a change in the drive pulse thereby creating detection data; and a timing control circuit operable to control a touch-detecting action by use of the first and second drive circuits and the detection circuit, and wherein the timing control circuit has a first touch detection mode in which detection data are created by accumulating, by use of the detection circuit, signals input more than once from the detection terminals in synchronization with a change of the drive pulse output by the first drive circuit, and a second touch detection mode in which detection data are created by accumulating, by use of the detection circuit, signals input more than once from the detection terminals of one of groups consisting of the even and odd detection terminals respectively in synchronization with a change of the drive pulse output from the second drive circuit through the detection terminals of the other group.

16. The electronic device according to claim 15, wherein the action of detecting a touch/no touch which the processor returns to its workable state from the sleep state to cause the touch panel controller to perform each time the given length of time elapses is an action according to the second touch detection mode.

17. The electronic device according to claim 16, wherein the processor in the sleep state returns to its workable state from the sleep state each time the given length of time elapses, wherein, when acquiring the result of judgment as "being touched", the processor makes a request for interrupt to the host processor, and waits for a touch-scan-activation instruction from the touch panel controller, and the display driver waits for an activation instruction from the host processor, and wherein the touch-detecting action in response to the touch-scan-activation instruction is an action according to the first touch detection mode.

18. The electronic device according to claim 17, wherein a touch condition when the processor judges as "being touched" in the second touch detection mode is that more than one touch position can be detected.

19. The electronic device according to claim 18, wherein the touch-scan-activation instruction includes an instruction for starting touch scan at intervals shorter than the given length of time, and wherein upon receipt of the touch-scan-activation instruction, the processor performs a coordinate calculation of a touch position based on touch detection signals obtained by the touch panel.

20. The electronic device according to claim 15, wherein the timing control circuit has a mode register which receives, from the host processor, instruction data for providing an instruction on which of the first and second touch detection modes to select, and rewritably stores the instruction data.

21. The electronic device according to claim 15, wherein the timing control circuit has a mode register which receives, from the host processor, instruction data for providing an instruction on which group of the even and odd detection terminal groups to direct the drive pulse to, and on which group to accept detection signal input from, and rewritably stores the instruction data.

* * * * *